United States Patent
Tsai et al.

(10) Patent No.: US 9,001,435 B2
(45) Date of Patent: Apr. 7, 2015

(54) OPTICAL IMAGE CAPTURING SYSTEM

(71) Applicant: Largan Precision Co., Ltd., Taichung (TW)

(72) Inventors: Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 74 days.

(21) Appl. No.: 13/932,437

(22) Filed: Jul. 1, 2013

(65) Prior Publication Data

US 2014/0340765 A1    Nov. 20, 2014

(30) Foreign Application Priority Data

May 14, 2013 (TW) .............................. 102116992 A

(51) Int. Cl.
*G02B 3/02* (2006.01)
*G02B 13/00* (2006.01)

(52) U.S. Cl.
CPC .................................. *G02B 13/0045* (2013.01)

(58) Field of Classification Search
CPC ............. G02B 9/60; G02B 3/04; G02B 13/18
USPC .................................................. 359/708, 714
See application file for complete search history.

(56) References Cited

U.S. PATENT DOCUMENTS

| 8,000,030 B2 * | 8/2011 | Tang .............................. 359/714 |
| 8,169,528 B2 | 5/2012 | Chen et al. |
| 2013/0265651 A1 | 10/2013 | Ishizaka |

FOREIGN PATENT DOCUMENTS

| CN | 203178555 U | 9/2013 |
| CN | 203773141 U | 8/2014 |
| CN | 203773142 U | 8/2014 |
| CN | 203773143 U | 8/2014 |
| JP | 2014197099 A | 3/2013 |
| JP | 2014197100 A | 3/2013 |
| JP | 2013214010 A | 10/2013 |
| KR | 1020090055115 A | 2/2009 |
| KR | 1020100001525 A | 6/2010 |
| KR | 1020120018573 A | 5/2012 |
| KR | 1020130059130 A | 5/2013 |
| WO | 2013175783 A1 | 11/2013 |

* cited by examiner

*Primary Examiner* — James Greece
(74) *Attorney, Agent, or Firm* — Tim Tingkang Xia, Esq.; Morris, Manning & Martin, LLP

(57) ABSTRACT

An optical image capturing system includes five lens elements with refractive power, in order from an object side to an image side, a first lens element, a second lens element, a third lens element, a fourth lens element and a fifth lens element. The first lens element with positive refractive power has a convex object-side surface. The second lens element with negative refractive power has a concave image-side surface. The third lens element has negative refractive power. The fourth lens element with refractive power has a concave image-side surface, and the surfaces of the fourth lens element are aspheric. The fifth lens element with refractive power has a concave image-side surface, wherein at least one inflection point formed on the image-side surface thereof, and the surfaces of the fifth lens element are aspheric.

22 Claims, 19 Drawing Sheets

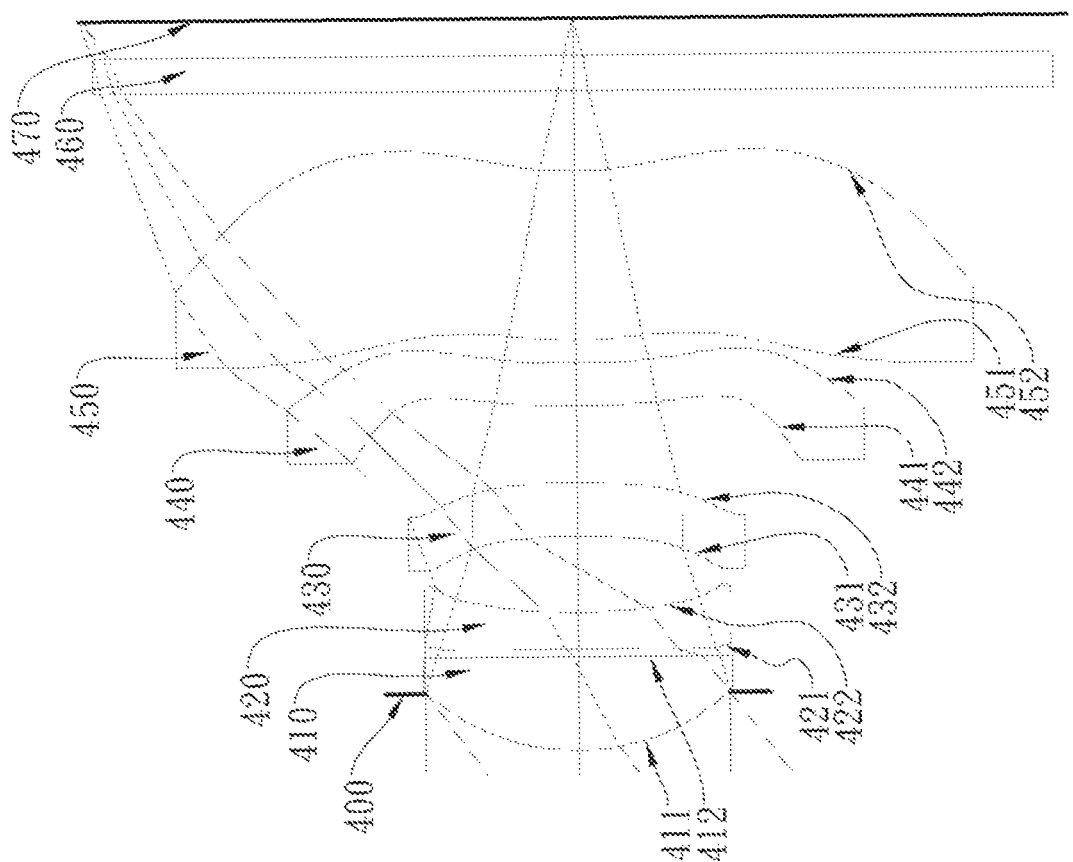

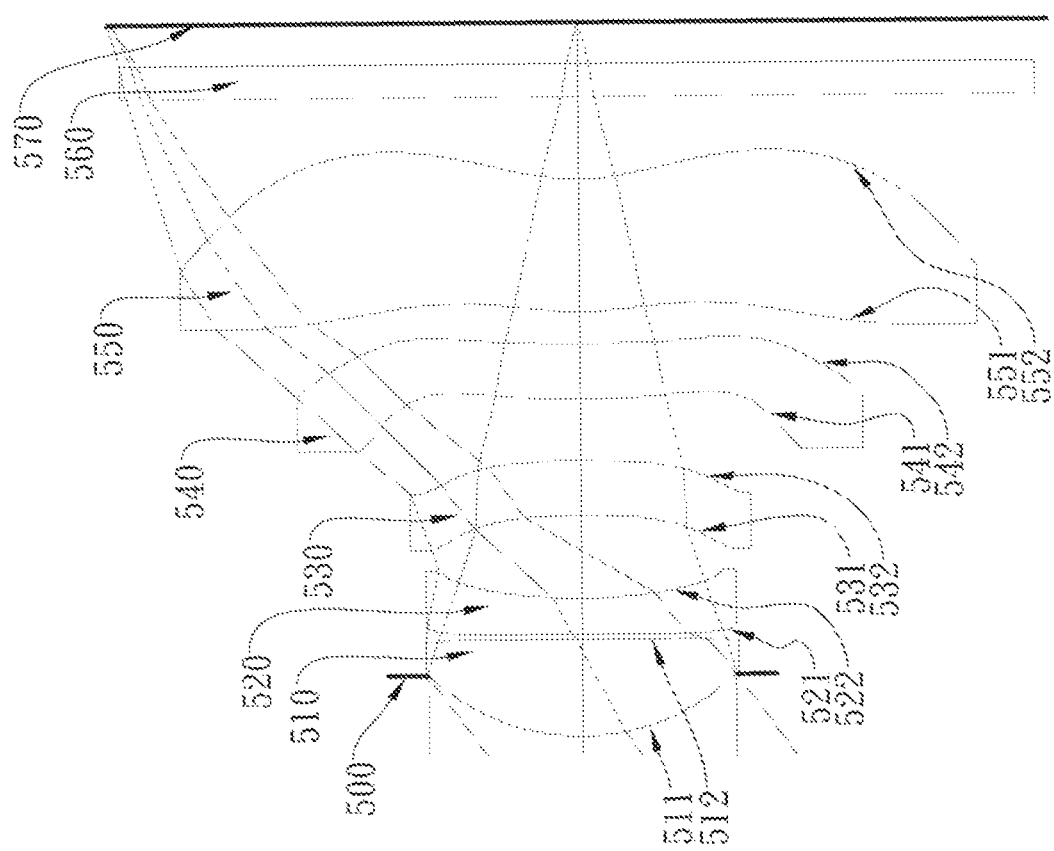

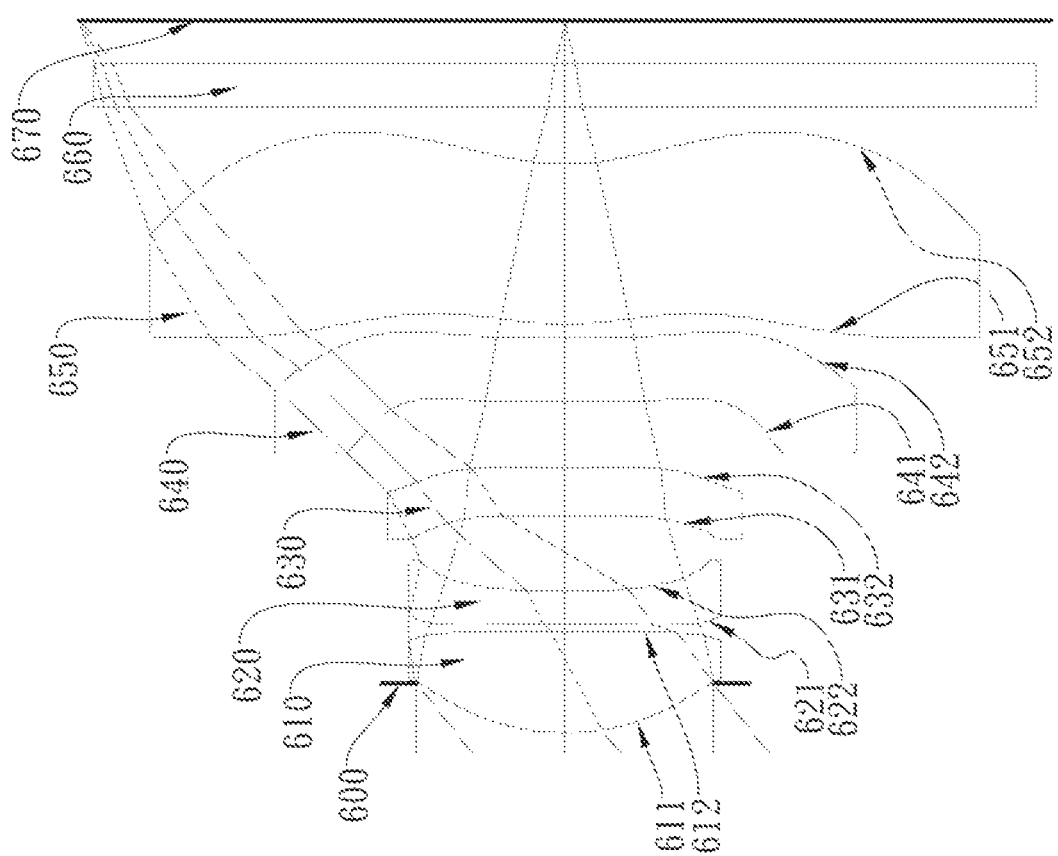

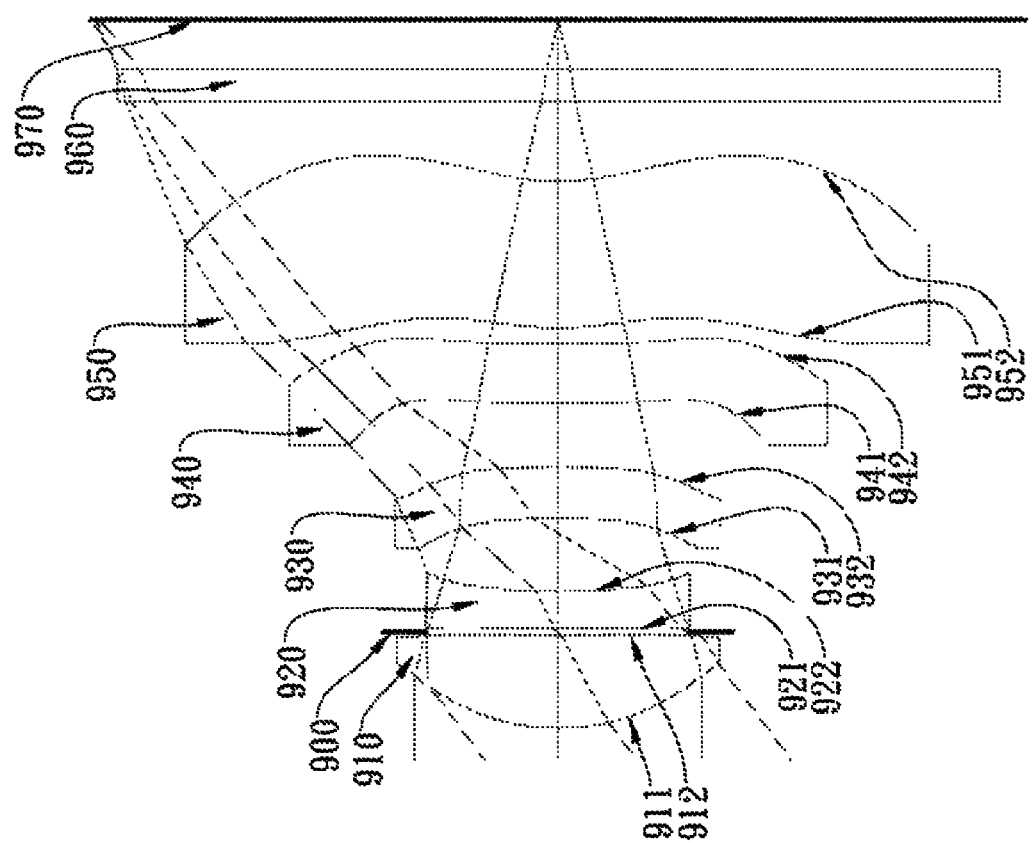

OPTICAL IMAGE CAPTURING SYSTEM

RELATED APPLICATIONS

The application claims priority to Taiwan Application Serial Number 102116992, filed May 14, 2013, which is herein incorporated by reference.

BACKGROUND

1. Technical Field

The present disclosure relates to an optical image capturing system. More particularly, the present disclosure relates to a miniaturized optical image capturing system applicable to portable electronic products.

2. Description of Related Art

In recent years, with the popularity of mobile products having camera functionalities, a demand for optical system has been increasing. A photosensitive sensor of a conventional optical system is typically a CCD (Charge-Coupled Device) or a CMOS (Complementary Metal-Oxide-Semiconductor) sensor. As the advanced semiconductor manufacturing technologies have allowed a pixel size of sensors to be reduced and the optical systems have gradually evolved toward a field of higher megapixels, there is an increasing demand for better image quality.

A conventional optical system employed in a portable electronic product, as shown in the U.S. Pat. No. 8,169,528, mainly adopts a structure of four lens elements. Due to the popularity of mobile products with high-end specifications, such as smart phones and PDAs (Personal Digital Assistants), requirements of higher megapixels and better image quality have been increasing rapidly. However, the conventional optical systems cannot satisfy the requirements of high-end optical systems with camera functionalities.

On the other hand, the third lens element together with the fourth lens element of a conventional optical system having five lens elements is often not arranged well; therefore, it is not favorable for correcting the astigmatism. Moreover, the total track length of the conventional optical system with five lens elements is too long; therefore, it results in poor image quality.

Accordingly, there is an increasing demand for compact optical lens systems featuring good astigmatism correction ability and better image quality.

SUMMARY

According to one aspect of the present disclosure, an optical image capturing system includes five lens elements with refractive power, in order from an object side to an image side, a first lens element, a second lens element, a third lens element, a fourth lens element and a fifth lens element. The first lens element with positive refractive power has a convex object-side surface. The second lens element with negative refractive power has a concave image-side surface. The third lens element has negative refractive power. The fourth lens element with refractive power has a concave image-side surface, wherein an object-side surface and the image-side surface of the fourth lens element are aspheric. The fifth lens element with refractive power has a concave image-side surface, wherein an object-side surface and the image-side surface of the fifth lens element are aspheric, and the fifth lens element has at least one inflection point on the image-side surface thereof. When a focal length of the optical image capturing system is f, a curvature radius of an object-side surface of the third lens element is R5, and a curvature radius of an image-side surface of the third lens element is R6, the following relationship is satisfied:

$$|f/R5|+|f/R6|<2.5.$$

According to another aspect of the present disclosure, an optical image capturing system includes five lens elements with refractive power, in order from an object side to an image side, a first lens element, a second lens element, a third lens element, a fourth lens element and a fifth lens element. The first lens element with positive refractive power has a convex object-side surface. The second lens element has refractive power. The third lens element has negative refractive power. The fourth lens element with refractive power has a concave image-side surface, wherein an object-side surface and the image-side surface of the fourth lens element are aspheric. The fifth lens element with refractive power has a concave image-side surface, wherein an object-side surface and the image-side surface of the fifth lens element are aspheric, and the fifth lens element has at least one inflection point on the image-side surface thereof. When an Abbe number of the first lens element is V1, and an Abbe number of the fourth lens element is V4, the following relationship is satisfied:

$$0.20<V4/V1<0.57.$$

BRIEF DESCRIPTION OF THE DRAWINGS

The disclosure can be more fully understood by reading the following detailed description of the embodiment, with reference made to the accompanying drawings as follows:

FIG. 4A is a schematic view of an optical image capturing system according to the 4th embodiment of the present disclosure;

FIG. 5A is a schematic view of an optical image capturing system according to the 5th embodiment of the present disclosure;

FIG. 6A is a schematic view of an optical image capturing system according to the 6th embodiment of the present disclosure;

FIG. 9A is a schematic view of an optical image capturing system according to the 9th embodiment of the present disclosure;

DETAILED DESCRIPTION

Figure 1A:
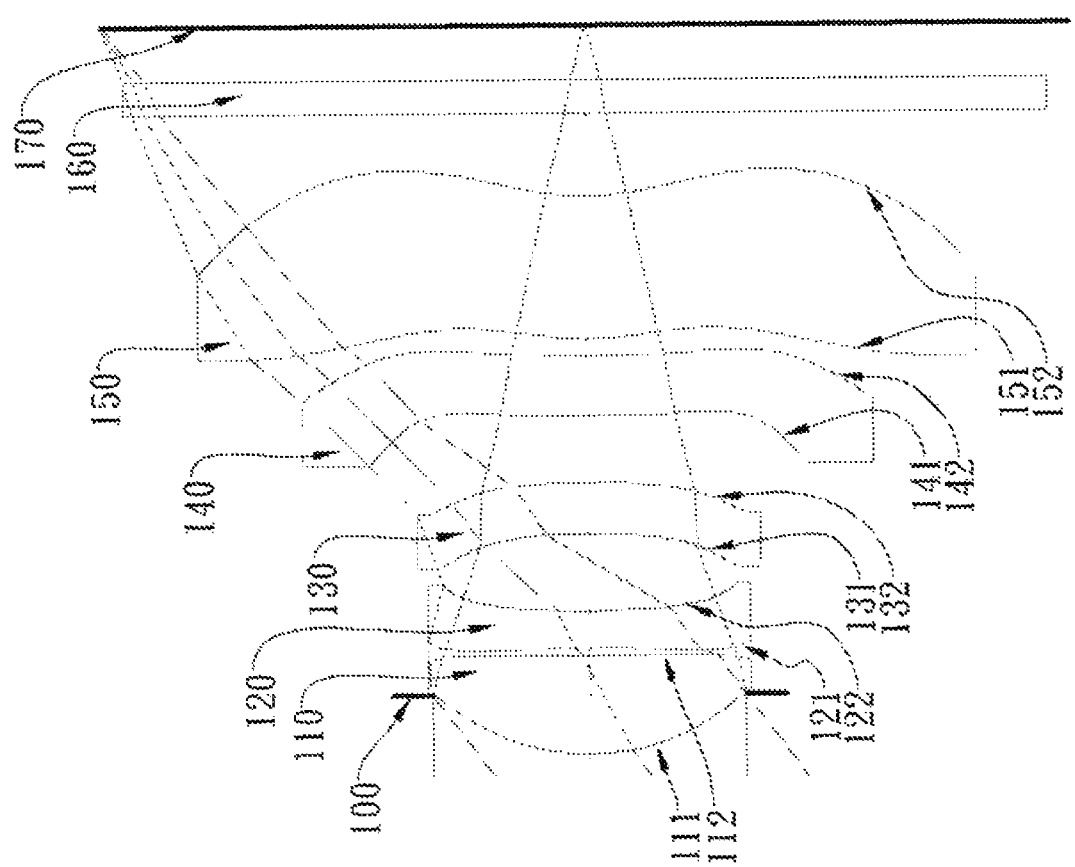
FIG. 1A is a schematic view of an optical image capturing system according to the 1st embodiment of the present disclosure.

An optical image capturing system includes five lens elements with refractive power, in order from an object side to an image side, a first lens element, a second lens element, a third lens element, a fourth lens element and a fifth lens element.

The first lens element has positive refractive power, so that it provides the optical image capturing system with the positive refractive power as it needs to be. The first lens element has a convex object-side surface, and it is thereby favorable for reducing the total track length of the optical image capturing system.

The second lens element can have negative refractive power, so that it is favorable for correcting the aberration generated by the first lens element. The second lens element can have a concave image-side surface, so that the astigmatism of the optical image capturing system can be corrected.

The third lens element has negative refractive power, so that the third lens element together with the second lens element is favorable for correcting the aberration and reducing the system sensitivity. The third lens element can have a concave object-side surface, so that it is favorable for correcting the astigmatism.

The fourth lens element can have negative refractive power, so that it is favorable for correcting the aberration of the optical image capturing system. The fourth lens element has a concave image-side surface, so that it is favorable for correcting the Petzval sum of the optical image capturing system so as to correct image curvature. Meanwhile, it is also favorable for enlarging the back focal length of the optical image capturing system and positioning the principal point away from the image plane so as to further reduce the total track length of the optical image capturing system. Moreover, the image-side surface of the fourth lens element has at least one convex shape at an off-axis region; therefore, the convex shape together with the arrangement of having a concave image-side surface at a paraxial region is favorable for correcting the aberration of the off-axis.

The fifth lens element can have a convex object-side surface; therefore, it is favorable for correcting the astigmatism of the optical image capturing system. Furthermore, the fifth lens element has a concave image-side surface and at least an inflection point on the image-side surface thereof; therefore, it is favorable for reducing the incident angle of the off-axis on an image sensor so as to improve the responding efficiency of the image sensor and to further correct the aberration of the off-axis.

When a focal length of the optical image capturing system is f, a curvature radius of the object-side surface of the third lens element is R5, and a curvature radius of an image-side surface of the third lens element is R6, the following relationship is satisfied: $f/|R5|+f/|R6|<2.5$. Therefore, it is favorable for balancing with the curvature of the third lens element so as to acquire better image quality. Preferably, the following relationship is satisfied: $f/|R5|+f/|R6|<1.8$.

When an Abbe number of the first lens element is V1, and an Abbe number of the fourth lens element is V4, the following relationship is satisfied: $0.20<V4/V1<0.57$. Therefore, the chromatic aberration of the optical image capturing system can be corrected.

When an axial distance between the fourth lens element and the fifth lens element is T45, and an axial distance between the third lens element and the fourth lens element is T34, the following relationship is satisfied: $0.05<T45/T34<0.9$. Therefore, it is favorable for assembling the lens elements of the optical image capturing system so as to increase the manufacturing yield rate.

When a curvature radius of the object-side surface of the fifth lens element is R9, and a curvature radius of the image-side surface of the fifth lens element is R10, the following relationship is satisfied: $0<(R9-R10)/(R9+R10)<0.2$. Therefore, the shape of the fifth lens element will not be excessively curved which is favorable for manufacturing and assembling the lens elements and correcting the astigmatism.

When a central thickness of the second lens element is CT2, a central thickness of the third lens element is CT3, a central thickness of the fourth lens element is CT4, a central thickness of the first lens element is CT1, and a central thickness of the fifth lens element is CT5, the following relationship is satisfied: $0.3<(CT2+CT3+CT4)/(CT1+CT5)<0.7$. Therefore, the thickness of every lens element is appropriate which is favorable for assembling the lens elements and reducing the total track length of the optical image capturing system.

When a focal length of the first lens element is f1, and a focal length of the second lens element is f2, the following relationship is satisfied: $-0.50<f1/f2<0$. Therefore, the refractive power of the first lens element and the refractive power of the second lens element will be more proper, which is favorable for correcting the aberration of the optical image capturing system.

When an Abbe number of the second lens element is V2, an Abbe number of the third lens element is V3, and the Abbe number of the fourth lens element is V4, the following relationship is satisfied: $V2+V3+V4<85$. Therefore, the chromatic aberration of the optical image capturing system can be adjusted and corrected.

The aforementioned optical image capturing system further includes a stop, such as an aperture stop, which is disposed between an imaged object and the first lens element, wherein an axial distance between the stop and the image-side surface of the fifth lens element is Sd, and an axial distance between the object-side surface of the first lens element and the image-side surface of the fifth lens element is Td, the following relationship is satisfied: $0.85<Sd/Td<0.95$. Therefore, it is favorable for the optical image capturing system making a good balance between the telecentric effect and the wide field of view.

When the focal length of the optical image capturing system is f, a focal length of the third lens element is f3, a focal length of the fourth lens element is f4, and a focal length of the fifth lens element is f5, the following relationship is satisfied: |f/f3|+|f/f4|+|f/f5|<0.6. Therefore, it is favorable for arranging the refractive power of the third lens element, the fourth lens element and the fifth lens element so as to reduce the sensitivity of the optical image capturing system.

The aforementioned optical image capturing system further includes the stop, such as the aperture stop, wherein the axial distance between the object-side surface of the first lens element and the image-side surface of the fifth lens element is Td, and an effective diameter of the stop is AD, the following relationship is satisfied: 1.2<Td/AD<2.0. Therefore, it is favorable for providing the optical image capturing system enough exposure so as to enhance image quality.

When a distance in parallel with an optical axis from an axial vertex on the object-side surface of the fourth lens element to 50% of a maximum effective diameter position on the object-side surface of the fourth lens element is SAGM41, and a distance in parallel with the optical axis from an axial vertex on the object-side surface of the fourth lens element to the maximum effective diameter position on the object-side surface of the fourth lens element is SAG41, the following relationship is satisfied: |SAGM41/(SAG41−SAGM41)|<0.25. Therefore, the shape of the fourth lens element will not be excessively curved and the thickness of the fourth lens element will be proper which is favorable for manufacturing and molding the lens elements. Moreover, it is also favorable for reducing the required space between the lens elements of the optical image capturing system so as to make the arrangement of the lens elements more compact.

When the focal length of the optical image capturing system is f, and a curvature radius of the image-side surface of the fourth lens element is R8, the following relationship is satisfied: 0<f/R8<1.5. It is favorable for effectively correcting the Petzval sum to correct image curvature.

When an f-number of the optical image capturing system is Fno, the following relationship is satisfied: Fno<2.2. Therefore, it is favorable for providing the optical image capturing system enough exposure.

Figure 10:
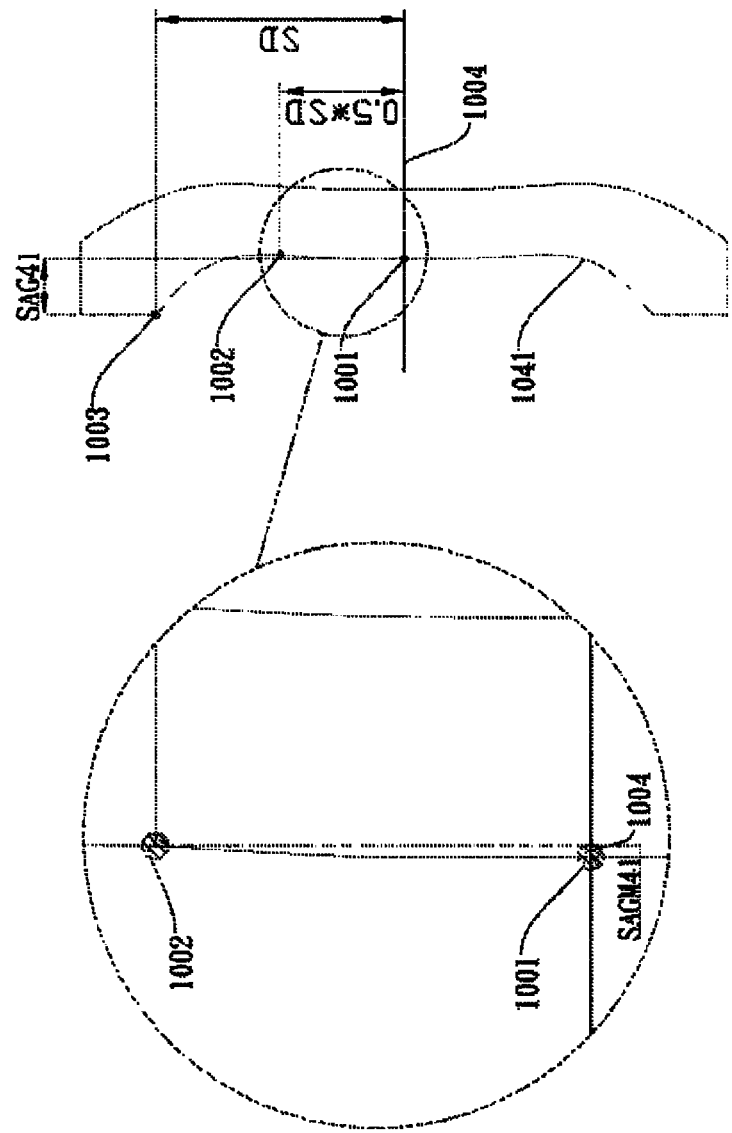
FIG. 10 shows the distances represented by SAGM41 and SAG41 of the optical image capturing system.

In FIG. 10, when a distance in parallel with an optical axis 1004 from an axial vertex 1001 on the object-side surface 1041 of the fourth lens element to 50% of a maximum effective diameter position (0.5*SD; 1002) on the object-side surface 1041 of the fourth lens element is SAGM41, and a distance in parallel with the optical axis 1004 from an axial vertex 1001 on the object-side surface 1041 of the fourth lens element to the maximum effective diameter position (SD; 1003) on the object-side surface 1041 of the fourth lens element is SAG41.

According to the optical image capturing system of the present disclosure, the lens elements can be made of plastic or glass material. When the lens elements are made of glass material, the distribution of the refractive power of the optical image capturing system can be more flexible to design. When the lens elements are made of plastic material, the manufacturing cost thereof can be reduced. Furthermore, surfaces of each lens element can be arranged to be aspheric, since the aspheric surface of the lens element is easy to form a shape other than spherical surface so as to have more controllable variables for eliminating the aberration thereof, and to further reduce the required number of the lens elements. Thus, the total track length of the optical image capturing system can be effectively reduced.

According to the optical image capturing system of the present disclosure, the optical image capturing system can include at least one stop, such as an aperture stop, a glare stop or a field stop. Said glare stop or said field stop is for eliminating the stray light and thereby improving the image resolution thereof.

According to the optical image capturing system of the present disclosure, an aperture stop can be configured as a front stop or a middle stop. A front stop disposed between an imaged object and the first lens element can provide a longer distance between an exit pupil of the system and an image plane and thereby improves the image-sensing efficiency of an image sensor. A middle stop disposed between the first lens element and the image plane is favorable for enlarging the field of view of the system and thereby provides a wider field of view for the same.

According to the optical image capturing system of the present disclosure, each of an object-side surface at a paraxial region thereof and an image-side surface at a paraxial region thereof of every lens element has a paraxial region thereof and an off-axis region thereof. The paraxial region thereof refers to the region of the surface where light rays travel close to an optical axis and the off-axis region thereof refers to the region of the surface where light rays travel away from the optical axis. Particularly, when the lens element has a convex surface, it indicates that the surface is convex at the paraxial region thereof; and when the lens element has a concave surface, it indicates that the surface is concave at the paraxial region thereof.

According to the optical image capturing system of the present disclosure, the optical image capturing system is featured with good correction ability and high image quality, and can be applied to 3D (three-dimensional) image capturing applications, in products such as digital cameras, mobile devices and tablets.

According to the above description of the present disclosure, the following 1st-9th specific embodiments are provided for further explanation.

1st Embodiment

Figure 1B:
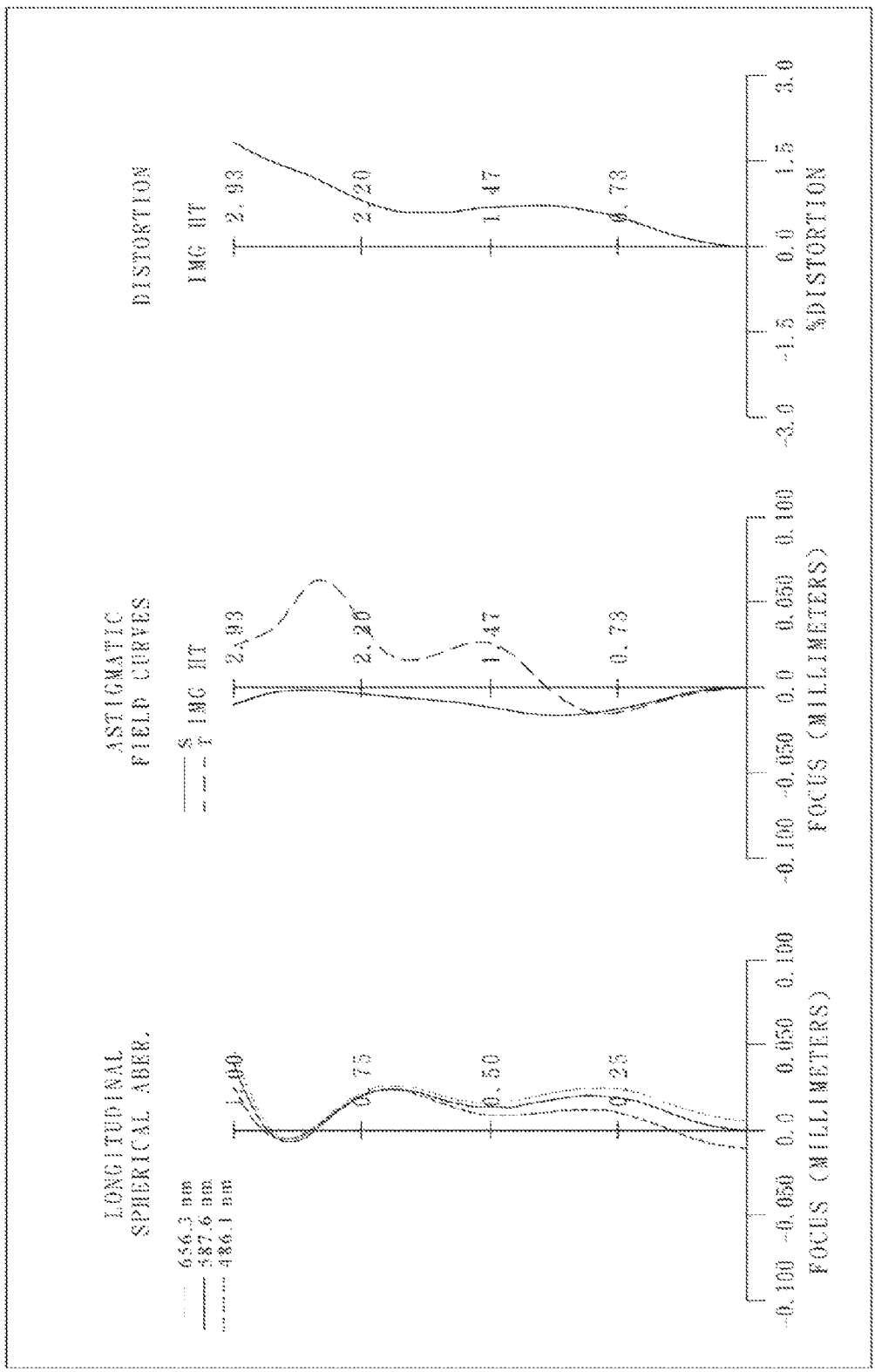
FIG. 1B shows spherical aberration curves, astigmatic field curves and a distortion curve of the optical image capturing system according to the 1st embodiment.

FIG. 1A is a schematic view of an optical image capturing system according to the 1st embodiment of the present disclosure. FIG. 1B shows spherical aberration curves, astigmatic field curves and a distortion curve of the optical image capturing system according to the 1st embodiment. In FIG. 1A, the optical image capturing system includes five lens elements with refractive power, in order from an object side to an image side, an aperture stop 100, a first lens element 110, a second lens element 120, a third lens element 130, a fourth lens element 140, a fifth lens element 150, an IR-cut filter 160, and an image plane 170.

The first lens element 110 with positive refractive power has a convex object-side surface 111 and a concave image-side surface 112. The first lens element 110 is made of plastic material and has the object-side surface 111 and the image-side surface 112 being aspheric.

The second lens element 120 with negative refractive power has a concave object-side surface 121 and a concave image-side surface 122. The second lens element 120 is made of plastic material and has the object-side surface 121 and the image-side surface 122 being aspheric.

The third lens element 130 with negative refractive power has a concave object-side surface 131 and a convex image-side surface 132. The third lens element 130 is made of plastic material and has the object-side surface 131 and the image-side surface 132 being aspheric.

The fourth lens element 140 with negative refractive power has a concave object-side surface 141 and a concave image-side surface 142. The fourth lens element 140 is made of plastic material and has the object-side surface 141 and the image-side surface 142 being aspheric. Furthermore, the image-side surface 142 of the fourth lens element 140 has at least one convex shape at an off-axis region.

The fifth lens element 150 with positive refractive power has a convex object-side surface 151 and a concave image-side surface 152. The fifth lens element 150 is made of plastic material and has the object-side surface 151 and the image-side surface 152 being aspheric. Furthermore, the fifth lens element 150 has at least one inflection point on the image-side surface 152 thereof.

The IR-cut filter 160 is made of glass material, wherein the IR-cut filter 160 is located between the fifth lens element 150 and the image plane 170, and will not affect the focal length of the optical image capturing system.

The equation of the aspheric surface profiles of the aforementioned lens elements of the 1st embodiment is expressed as follows:

$$X(Y)=(Y^2/R)/(1+\mathrm{sqrt}(1-(1+k)\times(Y/R)^2))+\Sigma_i(Ai)\times(Y^i),$$

wherein,

X is the relative distance of a point on the aspheric surface spaced at a distance Y from the optical axis relative to the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the optical image capturing system according to the 1st embodiment, when a focal length of the optical image capturing system is f, an f-number of the optical image capturing system is Fno, and half of the maximal field of view is HFOV, these parameters have the following values: f=3.81 mm; Fno=2.00; and HFOV=37.0 degrees.

In the optical image capturing system according to the 1st embodiment, when an Abbe number of the first lens element 110 is V1, an Abbe number of the second lens element 120 is V2, an Abbe number of the third lens element 130 is V3, and an Abbe number of the fourth lens element 140 is V4, the following relationships are satisfied: V4/V1=0.42; and V2+V3+V4=69.9.

In the optical image capturing system according to the 1st embodiment, when an axial distance between the third lens element 130 and the fourth lens element 140 is T34, and an axial distance between the fourth lens element 140 and the fifth lens element 150 is T45, the following relationship is satisfied: T45/T34=0.25.

In the optical image capturing system according to the 1st embodiment, when a central thickness of the first lens element 110 is CT1, a central thickness of the second lens element 120 is CT2, a central thickness of the third lens element 130 is CT3, a central thickness of the fourth lens element 140 is CT4, and a central thickness of the fifth lens element 150 is CT5, the following relationship is satisfied: (CT2+CT3+CT4)/(CT1+CT5)=0.62.

In the optical image capturing system according to the 1st embodiment, when the focal length of the optical image capturing system is f, a curvature radius of the object-side surface 131 of the third lens element 130 is R5, a curvature radius of the image-side surface 132 of the third lens element 130 is R6, and a curvature radius of the image-side surface 142 of the fourth lens element 140 is R8, the following relationships are satisfied: f/|R5|+f/|R6|=1.09; and f/R8=0.04.

In the optical image capturing system according to the 1st embodiment, when a curvature radius of the object-side surface 151 of the fifth lens element 150 is R9, and a curvature radius of the image-side surface 152 of the fifth lens element 150 is R10, the following relationship is satisfied: (R9−R10)/(R9+R10)=0.09.

In the optical image capturing system according to the 1st embodiment, when the focal length of the optical image capturing system is f, a focal length of the first lens element 110 is f1, a focal length of the second lens element 120 is f2, a focal length of the third lens element 130 is f3, a focal length of the fourth lens element 140 is f4, and a focal length of the fifth lens element 150 is f5, the following relationships are satisfied: f1/f2=−0.35; |f/f3|+|f/f4|+|f/f5|=0.31.

In the optical image capturing system according to the 1st embodiment, when an effective diameter of the aperture stop 100 is AD, and an axial distance between the object-side surface 111 of the first lens element 110 and the image-side surface 152 of the fifth lens element is Td, the following relationship is satisfied: Td/AD=1.78.

In the optical image capturing system according to the 1st embodiment, the aperture stop 100 is disposed between an imaged object and the first lens element 110, wherein an axial distance between the aperture stop 100 and the image-side surface 152 of the fifth lens element 150 is Sd, and the axial distance between the object-side surface 111 of the first lens element 110 and the image-side surface 152 of the fifth lens element is Td, the following relationship is satisfied: Sd/Td=0.89.

In the optical image capturing system according to the 1st embodiment, when a distance in parallel with an optical axis from an axial vertex on the object-side surface 141 of the fourth lens element 140 to 50% of a maximum effective diameter position on the object-side surface 141 of the fourth lens element 140 is SAGM41 and a distance in parallel with the optical axis from an axial vertex on the object-side surface 141 of the fourth lens element 140 to the maximum effective diameter position on the object-side surface 141 of the fourth lens element 140 is SAG41, the following relationship is satisfied: |SAGM41/(SAG41−SAGM41)|=0.06.

The detailed optical data of the 1st embodiment are shown in Table 1 and the aspheric surface data are shown in Table 2 below.

TABLE 1

1st Embodiment
f = 3.81 mm, Fno = 2.00, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.362 | | | | |
| 2 | Lens 1 | 1.362 | ASP | 0.601 | Plastic | 1.544 | 55.9 | 2.75 |
| 3 | | 13.006 | ASP | 0.040 | | | | |
| 4 | Lens 2 | −73.637 | ASP | 0.230 | Plastic | 1.640 | 23.3 | −7.80 |

TABLE 1-continued

1st Embodiment
f = 3.81 mm, Fno = 2.00, HFOV = 37.0 deg.

| Surface # | | Curvature Radius | | Thickness | Material | Index | Abbe # | Focal Length |
|---|---|---|---|---|---|---|---|---|
| 5 | | 5.357 | ASP | 0.470 | | | | |
| 6 | Lens 3 | −6.035 | ASP | 0.311 | Plastic | 1.640 | 23.3 | −36.47 |
| 7 | | −8.304 | ASP | 0.408 | | | | |
| 8 | Lens 4 | −14.628 | ASP | 0.367 | Plastic | 1.640 | 23.3 | −19.92 |
| 9 | | 100.000 | ASP | 0.100 | | | | |
| 10 | Lens 5 | 1.763 | ASP | 0.869 | Plastic | 1.544 | 55.9 | 250.47 |
| 11 | | 1.476 | ASP | 0.500 | | | | |
| 12 | IR-cut filter | Plano | | 0.210 | Glass | 1.517 | 64.2 | — |
| 13 | | Plano | | 0.331 | | | | |
| 14 | Image | Plano | | — | | | | |

Note:
Reference wavelength is 587.6 nm (d-line).

TABLE 2

Aspheric Coefficients

| Surface # | | | | |
|---|---|---|---|---|
| 2 | 3 | 4 | 5 | 6 |
| k = 1.5498E−01 | 3.8414E+00 | 5.0000E+00 | −3.0000E+01 | 4.5682E+00 |
| A4 = −2.9943E−02 | −9.3516E−02 | −9.9700E−02 | 2.3973E−02 | −1.5976E−01 |
| A6 = 1.3823E−01 | −1.7113E−01 | 5.4017E−02 | 1.6640E−01 | −2.5885E−01 |
| A8 = −4.1295E−01 | 1.2046E+00 | 7.8650E−01 | −1.2886E−01 | −1.1771E−01 |
| A10 = 5.6985E−01 | −2.3636E+00 | −1.9237E+00 | 7.1522E−02 | 3.1218E+00 |
| A12 = −3.3020E−01 | 1.9706E+00 | 1.8275E+00 | −7.9945E−02 | −8.7094E+00 |
| A14 = 6.9456E−03 | −6.1993E−01 | −5.7724E−01 | 2.7088E−01 | 1.0096E+01 |
| A16 = | | | | −4.1658E+00 |

| Surface # | | | | |
|---|---|---|---|---|
| 7 | 8 | 9 | 10 | 11 |
| k = 2.8786E+01 | 5.0000E+00 | −3.0000E+01 | −3.2529E+00 | −4.0097E+00 |
| A4 = −1.0718E−01 | 4.0916E−01 | 1.6502E−01 | −3.7273E−01 | −1.8274E−01 |
| A6 = −7.5850E−02 | −8.3876E−01 | −2.3039E−01 | 2.5410E−01 | 1.1131E−01 |
| A8 = −8.3358E−01 | 8.5933E−01 | 1.3267E−01 | −1.0153E−01 | −5.4596E−02 |
| A10 = 3.0583E+00 | −6.3119E−01 | −5.9643E−02 | 2.6075E−02 | 1.7569E−02 |
| A12 = −4.5438E+00 | 2.6737E−01 | 2.0668E−02 | −4.1756E−03 | −3.3631E−03 |
| A14 = 3.2813E+00 | −5.4182E−02 | −4.1430E−03 | 3.7732E−04 | 3.4213E−04 |
| A16 = −9.0061E−01 | 4.0493E−03 | 3.3279E−04 | −1.4672E−05 | −1.4138E−05 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 2A:
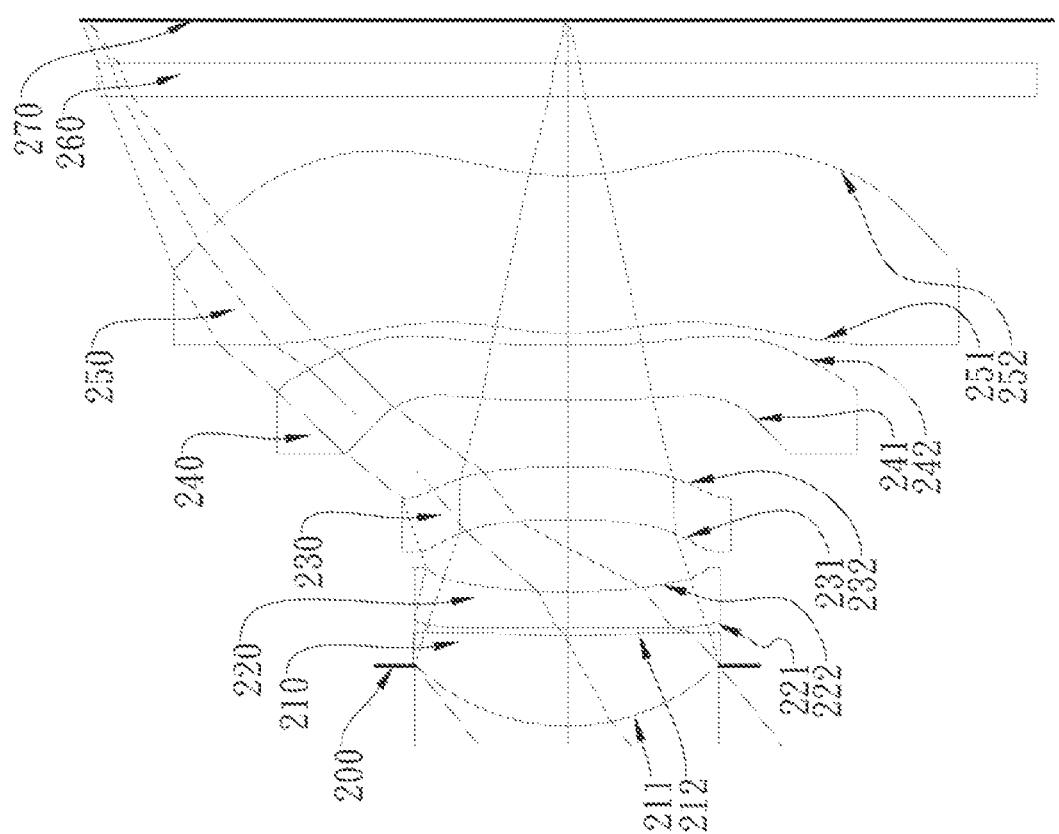
FIG. 2A is a schematic view of an optical image capturing system according to the 2nd embodiment of the present disclosure.
Figure 2B:
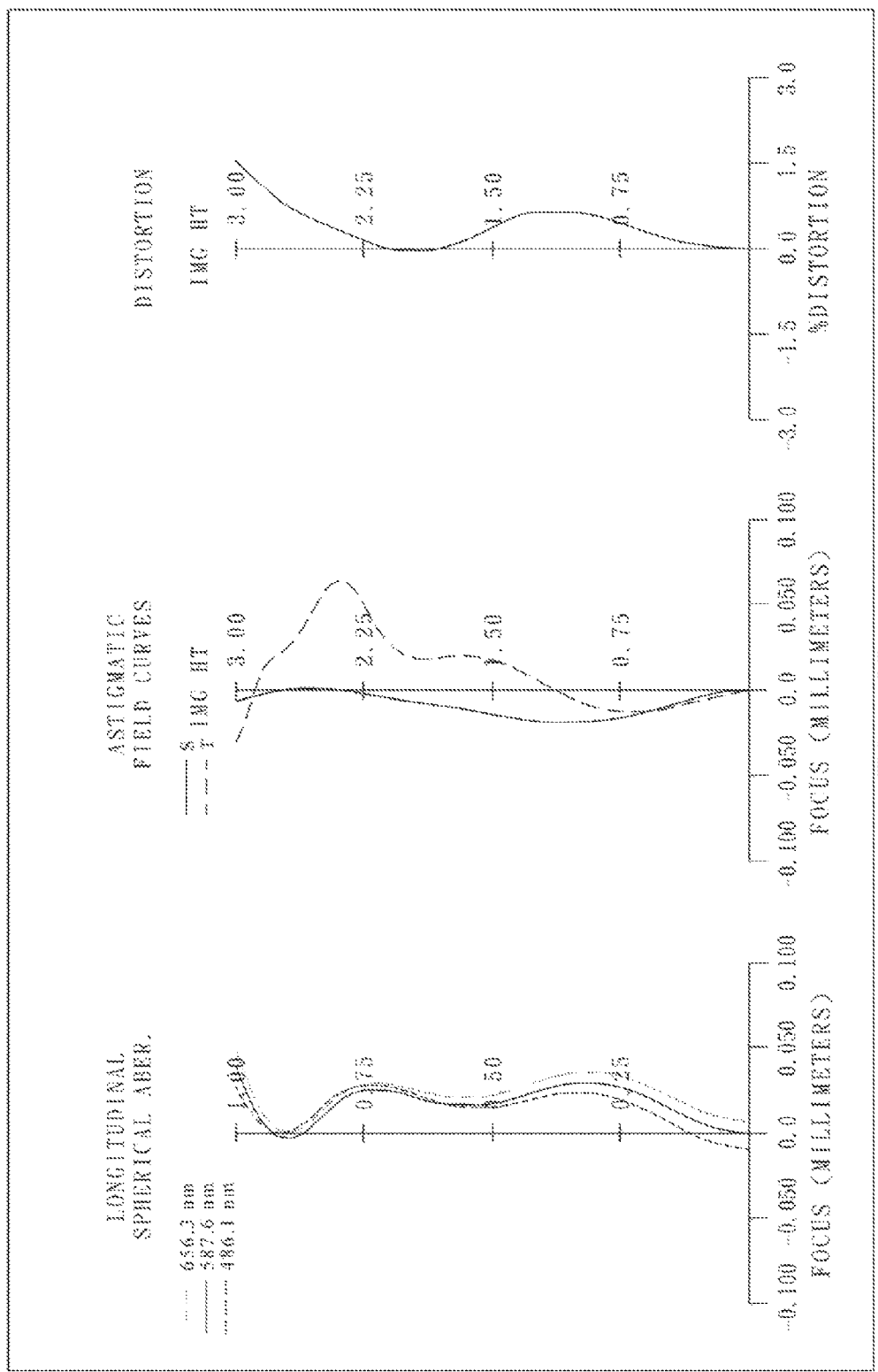
FIG. 2B shows spherical aberration curves, astigmatic field curves and a distortion curve of the optical image capturing system according to the 2nd embodiment.

FIG. 2A is a schematic view of an optical image capturing system according to the 2nd embodiment of the present disclosure. FIG. 2B shows spherical aberration curves, astigmatic field curves and a distortion curve of the optical image capturing system according to the 2nd embodiment. In FIG. 2A, the optical image capturing system includes five lens elements with refractive power, in order from an object side to an image side, an aperture stop 200, a first lens element 210, a second lens element 220, a third lens element 230, a fourth lens element 240, a fifth lens element 250, an IR-cut filter 260, and an image plane 270.

The first lens element 210 with positive refractive power has a convex object-side surface 211 and a concave image-side surface 212. The first lens element 210 is made of plastic material and has the object-side surface 211 and the image-side surface 212 being aspheric.

The second lens element 220 with negative refractive power has a convex object-side surface 221 and a concave image-side surface 222. The second lens element 220 is made of plastic material and has the object-side surface 221 and the image-side surface 222 being aspheric.

The third lens element 230 with negative refractive power has a concave object-side surface 231 and a convex image-side surface 232. The third lens element 230 is made of plastic material and has the object-side surface 231 and the image-side surface 232 being aspheric.

The fourth lens element 240 with negative refractive power has a concave object-side surface 241 and a concave image-side surface 242. The fourth lens element 240 is made of plastic material and has the object-side surface 241 and the image-side surface 242 being aspheric. Furthermore, the image-side surface 242 of the fourth lens element 240 has at least one convex shape at an off-axis region.

The fifth lens element 250 with positive refractive power has a convex object-side surface 251 and a concave image-side surface 252. The fifth lens element 250 is made of plastic material and has the object-side surface 251 and the image-side surface 252 being aspheric. Furthermore, the fifth lens element 250 has at least one inflection point on the image-side surface 252 thereof.

The IR-cut filter 260 is made of glass material, wherein the IR-cut filter 260 is located between the fifth lens element 250 and the image plane 270, and will not affect the focal length of the optical image capturing system.

The detailed optical data of the 2nd embodiment are shown in Table 3 and the aspheric surface data are shown in Table 4 below.

TABLE 3

2nd Embodiment
f = 3.72 mm, Fno = 1.95, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.378 | | | | |
| 2 | Lens 1 | 1.379 | ASP | 0.570 | Plastic | 1.544 | 55.9 | 2.97 |
| 3 | | 7.990 | ASP | 0.041 | | | | |
| 4 | Lens 2 | 10.136 | ASP | 0.230 | Plastic | 1.650 | 21.4 | −10.01 |
| 5 | | 3.927 | ASP | 0.453 | | | | |
| 6 | Lens 3 | −5.571 | ASP | 0.330 | Plastic | 1.650 | 21.4 | −106.73 |
| 7 | | −6.199 | ASP | 0.420 | | | | |
| 8 | Lens 4 | −26.774 | ASP | 0.343 | Plastic | 1.650 | 21.4 | −10.96 |
| 9 | | 9.752 | ASP | 0.074 | | | | |
| 10 | Lens 5 | 1.724 | ASP | 0.990 | Plastic | 1.535 | 55.7 | 21.13 |
| 11 | | 1.627 | ASP | 0.500 | | | | |
| 12 | IR-cut filter | Plano | | 0.210 | Glass | 1.517 | 64.2 | — |
| 13 | | Plano | | 0.269 | | | | |
| 14 | Image | Plano | | — | | | | |

Note:
Reference wavelength is 587.6 nm (d-line).

TABLE 4

| Aspheric Coefficients | | | | | |
|---|---|---|---|---|---|
| | Surface # | | | | |
| | 2 | 3 | 4 | 5 | 6 |
| k = | 1.6145E−01 | −7.9682E+00 | −2.6606E+01 | −9.0598E+00 | −2.6869E+01 |
| A4 = | −3.0608E−02 | −7.8740E−02 | −1.3471E−01 | −2.9333E−02 | −1.6466E−01 |
| A6 = | 1.5658E−01 | −1.9455E−01 | 3.9220E−02 | 1.2857E−01 | −2.7535E−01 |
| A8 = | −4.1559E−01 | 1.1853E+00 | 7.6151E−01 | −8.2906E−03 | −1.2910E−01 |
| A10 = | 5.5099E−01 | −2.3043E+00 | −1.8745E+00 | −5.3389E−02 | 3.1071E+00 |
| A12 = | −3.2489E−01 | 1.9787E+00 | 1.8404E+00 | −1.7488E−01 | −8.6632E+00 |
| A14 = | 3.8917E−02 | −6.2407E−01 | −5.9496E−01 | 4.2674E−01 | 1.0119E+01 |
| A16 = | | | | | −4.1657E+00 |
| | Surface # | | | | |
| | 7 | 8 | 9 | 10 | 11 |
| k = | −1.7405E+01 | 4.8452E+00 | −7.2692E+00 | −2.8079E+00 | −2.0457E+00 |
| A4 = | −1.0982E−01 | 4.0585E−01 | 1.4758E−01 | −3.7649E−01 | −2.0375E−01 |
| A6 = | −8.2462E−02 | −8.3096E−01 | −2.2973E−01 | 2.5521E−01 | 1.1340E−01 |
| A8 = | −8.3356E−01 | 8.4966E−01 | 1.3346E−01 | −1.0155E−01 | −5.4308E−02 |
| A10 = | 3.0549E+00 | −6.2984E−01 | −5.9668E−02 | 2.6054E−02 | 1.7540E−02 |
| A12 = | −4.5437E+00 | 2.6893E−01 | 2.0700E−02 | −4.1768E−03 | −3.3697E−03 |
| A14 = | 3.2842E+00 | −5.3626E−02 | −4.1459E−03 | 3.7791E−04 | 3.4161E−04 |
| A16 = | −8.9252E−01 | 3.5925E−03 | 3.3145E−04 | −1.4699E−05 | −1.3967E−05 |

In the optical image capturing system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| 2nd Embodiment | | | |
|---|---|---|---|
| f [mm] | 3.72 | f/R8 | 0.38 |
| Fno | 1.95 | (R9 − R10)/(R9 + R10) | 0.03 |
| HFOV [deg.] | 38.4 | f1/f2 | −0.30 |
| V4/V1 | 0.38 | \|f/f3\| + \|f/f4\| + \|f/f5\| | 0.55 |
| V2 + V3 + V4 | 64.2 | Td/AD | 1.81 |
| T45/T34 | 0.18 | Sd/Td | 0.89 |
| (CT2 + CT3 + CT4)/(CT1 + CT5) | 0.58 | \|SAGM41/(SAG41 − SAGM41)\| | 0.08 |
| f/\|R5\| + f/\|R6\| | 1.27 | | |

3rd Embodiment

Figure 3A:
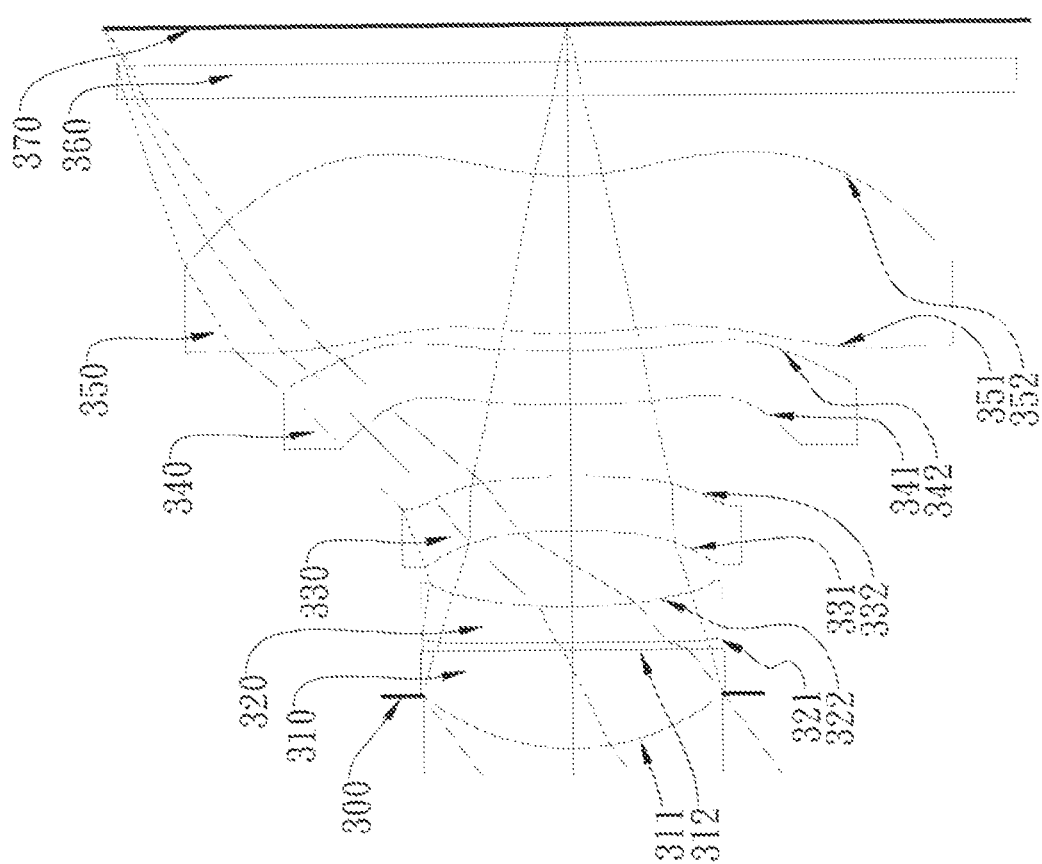
FIG. 3A is a schematic view of an optical image capturing system according to the 3rd embodiment of the present disclosure.
Figure 3B:
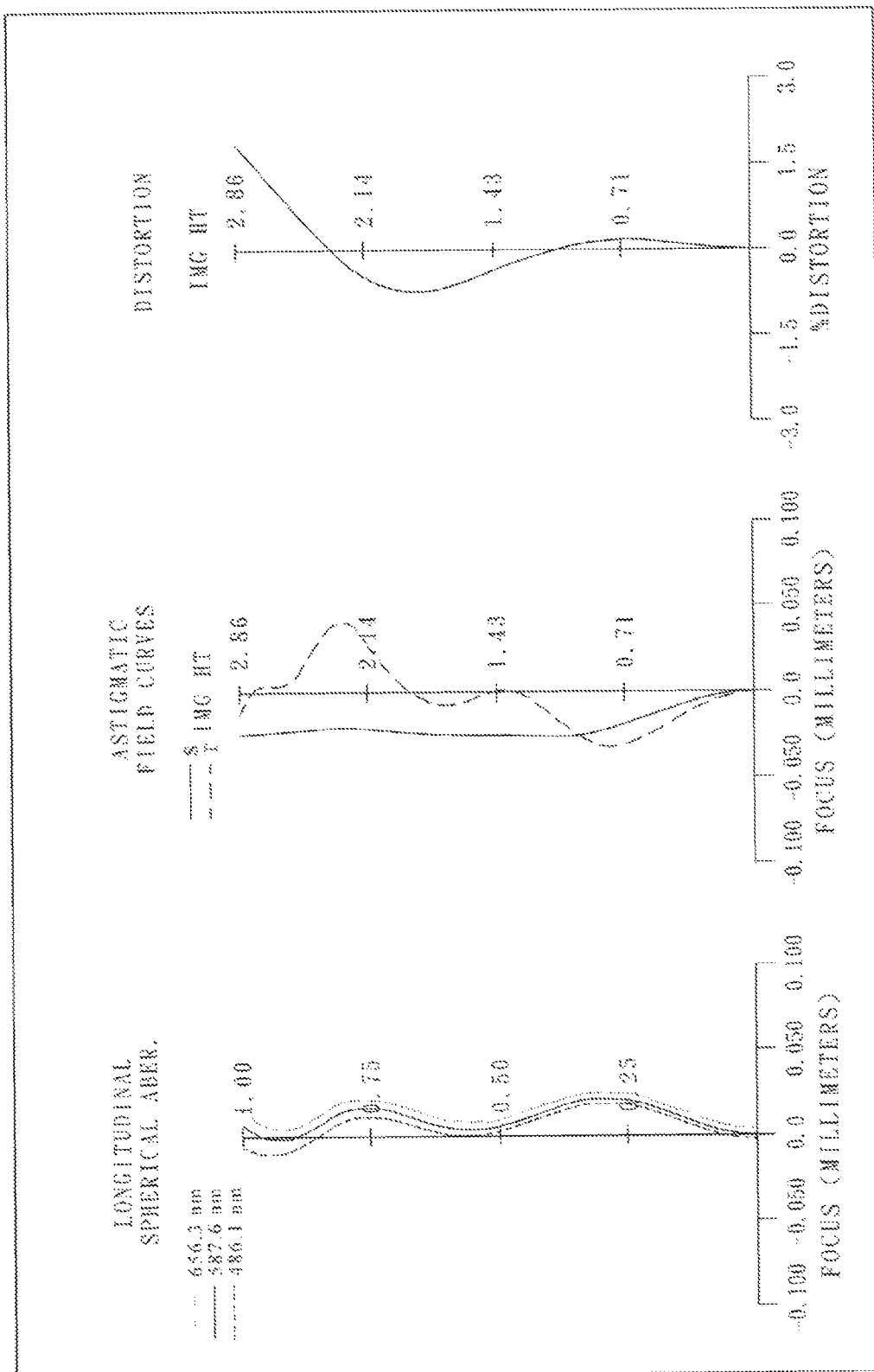
FIG. 3B shows spherical aberration curves, astigmatic field curves and a distortion curve of the optical image capturing system according to the 3rd embodiment.

FIG. 3A is a schematic view of an optical image capturing system according to the 3rd embodiment of the present disclosure. FIG. 3B shows spherical aberration curves, astigmatic field curves and a distortion curve of the optical image capturing system according to the 3rd embodiment. In FIG. 3A, the optical image capturing system includes five lens elements with refractive power, in order from an object side to an image side, an aperture stop 300, a first lens element 310, a second lens element 320, a third lens element 330, a fourth lens element 340, a fifth lens element 350, an IR-cut filter 360 and an image plane 370.

The first lens element 310 with positive refractive power has a convex object-side surface 311 and a convex image-side surface 312. The first lens element 310 is made of plastic material and has the object-side surface 311 and the image-side surface 312 being aspheric.

The second lens element 320 with negative refractive power has a concave object-side surface 321 and a concave image-side surface 322. The second lens element 320 is made of plastic material and has the object-side surface 321 and the image-side surface 322 being aspheric.

The third lens element 330 with negative refractive power has a concave object-side surface 331 and a convex image-side surface 332. The third lens element 330 is made of plastic material and has the object-side surface 331 and the image-side surface 332 being aspheric.

The fourth lens element 340 with negative refractive power has a concave object-side surface 341 and a concave image-side surface 342. The fourth lens element 340 is made of plastic material and has the object-side surface 341 and the image-side surface 342 being aspheric. Furthermore, the image-side surface 342 of the fourth lens element 340 has at least one convex shape at an off-axis region.

The fifth lens element 350 with negative refractive power has a convex object-side surface 351 and a concave image-side surface 352. The fifth lens element 350 is made of plastic material and has the object-side surface 351 and the image-side surface 352 being aspheric. Furthermore, the fifth lens element 350 has at least one inflection point on the image-side surface 352 thereof.

The IR-cut filter 360 is made of glass material, wherein the IR-cut filter 360 is located between the fifth lens element 350 and the image plane 370, and will not affect the focal length of the optical image capturing system.

The detailed optical data of the 3rd embodiment are shown in Table 5 and the aspheric surface data are shown in Table 6 below.

TABLE 5

3rd Embodiment
f = 3.82 mm, Fno = 2.05, HFOV = 36.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.333 | | | | |
| 2 | Lens 1 | 1.453 | ASP | 0.615 | Plastic | 1.575 | 56.5 | 2.45 |
| 3 | | −37.411 | ASP | 0.045 | | | | |
| 4 | Lens 2 | −147.723 | ASP | 0.220 | Plastic | 1.634 | 23.8 | −4.90 |
| 5 | | 3.173 | ASP | 0.471 | | | | |
| 6 | Lens 3 | −5.997 | ASP | 0.342 | Plastic | 1.607 | 26.6 | −62.45 |
| 7 | | −7.276 | ASP | 0.445 | | | | |
| 8 | Lens 4 | −1405.752 | ASP | 0.333 | Plastic | 1.634 | 23.8 | −35.44 |
| 9 | | 22.835 | ASP | 0.100 | | | | |
| 10 | Lens 5 | 2.100 | ASP | 0.986 | Plastic | 1.544 | 55.9 | −51.58 |
| 11 | | 1.631 | ASP | 0.500 | | | | |
| 12 | IR-cut filter | Plano | | 0.210 | Glass | 1.517 | 64.2 | — |
| 13 | | Plano | | 0.231 | | | | |
| 14 | Image | Plano | | — | | | | |

Note:
Reference wavelength is 587.6 nm (d-line).

TABLE 6

Aspheric Coefficients

| | Surface # | | | | |
|---|---|---|---|---|---|
| | 2 | 3 | 4 | 5 | 6 |
| k = | 2.1698E−01 | −1.0000E+00 | 5.0000E+00 | −7.9533E+00 | −2.9328E+01 |
| A4 = | −2.6574E−02 | 4.3508E−02 | −1.1632E−02 | −6.1256E−03 | −1.7811E−01 |

TABLE 6-continued

| Aspheric Coefficients | | | | |
|---|---|---|---|---|
| A6 = | 1.3005E−01 | −2.6842E−01 | −6.1288E−02 | 1.0753E−01 | −2.8881E−01 |
| A8 = | −3.7020E−01 | 1.1627E+00 | 7.5249E−01 | −9.4766E−02 | −1.3079E−01 |
| A10 = | 5.4238E−01 | −2.2726E+00 | −1.8497E+00 | 6.2074E−02 | 3.1629E+00 |
| A12 = | −3.9345E−01 | 2.0129E+00 | 1.8864E+00 | −1.3675E−01 | −8.7112E+00 |
| A14 = | 1.0125E−01 | −6.5508E−01 | −6.5142E−01 | 2.7117E−01 | 1.0096E+01 |
| A16 = | | | | | −4.1663E+00 |

| Surface # | | | | |
|---|---|---|---|---|
| 7 | 8 | 9 | 10 | 11 |
| k = −2.1689E+01 | −9.9903E−01 | −1.1416E+01 | −1.9475E+00 | −3.7621E+00 |
| A4 = −1.2314E−01 | 4.0718E−01 | 1.8400E−01 | −3.7821E−01 | −1.8405E−01 |
| A6 = −6.5455E−02 | −8.0784E−01 | −2.4507E−01 | 2.5533E−01 | 1.1055E−01 |
| A8 = −8.4805E−01 | 8.4035E−01 | 1.3447E−01 | −1.0150E−01 | −5.4529E−02 |
| A10 = 3.0613E+00 | −6.2637E−01 | −5.9169E−02 | 2.6053E−02 | 1.7585E−02 |
| A12 = −4.5319E+00 | 2.6984E−01 | 2.0717E−02 | −4.1773E−03 | −3.3631E−03 |
| A14 = 3.2924E+00 | −5.4462E−02 | −4.1440E−03 | 3.7687E−04 | 3.4204E−04 |
| A16 = −9.1625E−01 | 3.4251E−03 | 3.2581E−04 | −1.4543E−05 | −1.4157E−05 |

In the optical image capturing system according to the 3rd embodiment, the definitions of these parameters shown in the following table are the same as those stated in the 1st embodiment with corresponding values for the 3rd embodiment. Moreover, these parameters can be calculated from Table 3 and Table 4 as the following values and satisfy the following relationships:

| 3rd Embodiment | | | |
|---|---|---|---|
| f [mm] | 3.82 | f/R8 | 0.17 |
| Fno | 2.05 | (R9 − R10)/(R9 + R10) | 0.13 |
| HFOV [deg.] | 36.2 | f1/f2 | −0.50 |
| V4/V1 | 0.42 | \|f/f3\| + \|f/f4\| + \|f/f5\| | 0.24 |
| V2 + V3 + V4 | 74.2 | Td/AD | 1.91 |
| T45/T34 | 0.22 | Sd/Td | 0.91 |
| (CT2 + CT3 + CT4)/(CT1 + CT5) | 0.56 | \|SAGM41/(SAG41 − SAGM41)\| | 0.17 |
| f/\|R5\| + f/\|R6\| | 1.16 | | |

4th Embodiment

Figure 4B:
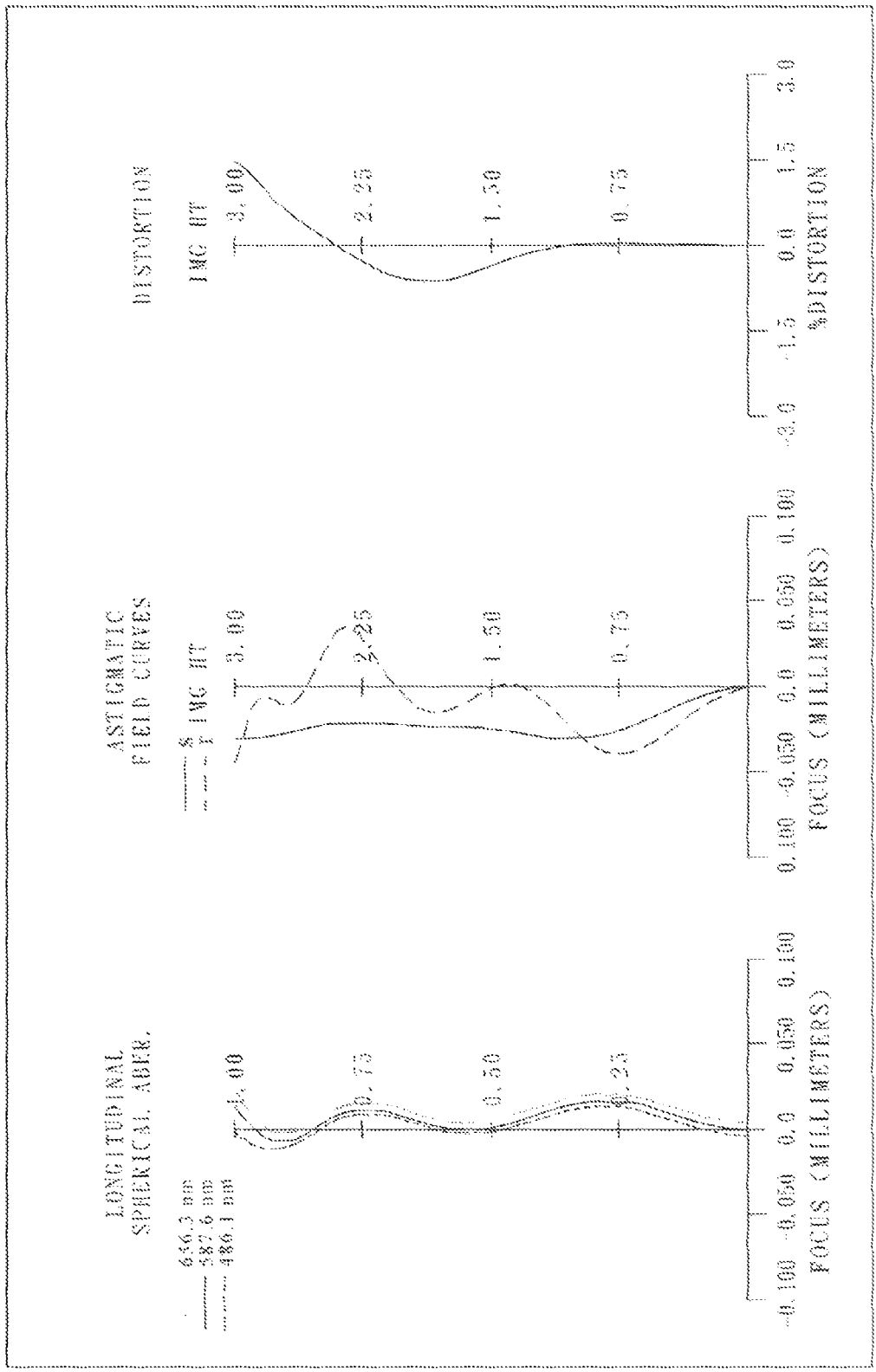
FIG. 4B shows spherical aberration curves, astigmatic field curves and a distortion curve of the optical image capturing system according to the 4th embodiment.

FIG. 4A is a schematic view of an optical image capturing system according to the 4th embodiment of the present disclosure. FIG. 4B shows spherical aberration curves, astigmatic field curves and a distortion curve of the optical image capturing system according to the 4th embodiment. In FIG. 4A, the optical image capturing system includes five lens elements with refractive power, in order from an object side to an image side, an aperture stop 400, a first lens element 410, a second lens element 420, a third lens element 430, a fourth lens element 440, a fifth lens element 450, an IR-cut filter 460 and an image plane 470.

The first lens element 410 with positive refractive power has a convex object-side surface 411 and a concave image-side surface 412. The first lens element 410 is made of plastic material and has the object-side surface 411 and the image-side surface 412 being aspheric.

The second lens element 420 with negative refractive power has a concave object-side surface 421 and a concave image-side surface 422. The second lens element 420 is made of plastic material and has the object-side surface 421 and the image-side surface 422 being aspheric.

The third lens element 430 with negative refractive power has a concave object-side surface 431 and a convex image-side surface 432. The third lens element 430 is made of plastic material and has the object-side surface 431 and the image-side surface 432 being aspheric.

The fourth lens element 440 with negative refractive power has a convex object-side surface 441 and a concave image-side surface 442. The fourth lens element 440 is made of plastic material and has the object-side surface 441 and the image-side surface 442 being aspheric. Furthermore, the image-side surface 442 of the fourth lens element 440 has at least one convex shape at an off-axis region.

The fifth lens element 450 with positive refractive power has a convex object-side surface 451 and a concave image-side surface 452. The fifth lens element 450 is made of plastic material and has the object-side surface 451 and the image-side surface 452 being aspheric. Furthermore, the fifth lens element 450 has at least one inflection point on the image-side surface 452 thereof.

The IR-cut filter 460 is made of glass material, wherein the IR-cut filter 460 is located between the fifth lens element 450 and the image plane 470, and will not affect the focal length of the optical image capturing system.

The detailed optical data of the 4th embodiment are shown in Table 7 and the aspheric surface data are shown in Table 8 below.

TABLE 7

4th Embodiment
f = 3.92 mm, Fno = 2.10, HFOV = 37.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.354 | | | | |

TABLE 7-continued

4th Embodiment
f = 3.92 mm, Fno = 2.10, HFOV = 37.0 deg.

| Surface # | | Curvature Radius | | Thickness | Material | Index | Abbe # | Focal Length |
|---|---|---|---|---|---|---|---|---|
| 2 | Lens 1 | 1.393 | ASP | 0.574 | Plastic | 1.556 | 55.9 | 2.51 |
| 3 | | 321.703 | ASP | 0.045 | | | | |
| 4 | Lens 2 | −128.604 | ASP | 0.230 | Plastic | 1.634 | 23.8 | −5.44 |
| 5 | | 3.547 | ASP | 0.468 | | | | |
| 6 | Lens 3 | −5.332 | ASP | 0.329 | Plastic | 1.634 | 23.8 | −218.67 |
| 7 | | −5.678 | ASP | 0.471 | | | | |
| 8 | Lens 4 | 14.868 | ASP | 0.260 | Plastic | 1.634 | 23.8 | −12.75 |
| 9 | | 5.200 | ASP | 0.141 | | | | |
| 10 | Lens 5 | 2.137 | ASP | 1.040 | Plastic | 1.556 | 55.9 | 444.96 |
| 11 | | 1.781 | ASP | 0.500 | | | | |
| 12 | IR-cut filter | Plano | | 0.210 | Glass | 1.517 | 64.2 | — |
| 13 | | Plano | | 0.232 | | | | |
| 14 | Image | Plano | | — | | | | |

Note:
Reference wavelength is 587.6 nm (d-line).

TABLE 8

Aspheric Coefficients

| | Surface # | | | | |
|---|---|---|---|---|---|
| | 2 | 3 | 4 | 5 | 6 |
| k = | 1.9700E−01 | −1.0000E+00 | 5.0000E+00 | −5.1609E+00 | −2.6501E+01 |
| A4 = | −2.3246E−02 | 1.7994E−02 | −2.6907E−02 | −4.4871E−03 | −1.6675E−01 |
| A6 = | 1.2137E−01 | −2.6445E−01 | −6.2364E−02 | 1.0290E−01 | −2.9804E−01 |
| A8 = | −3.6172E−01 | 1.1647E+00 | 7.7351E−01 | −4.3482E−02 | −1.3662E+00 |
| A10 = | 5.4659E−01 | −2.2600E+00 | −1.8364E+00 | 4.8845E−02 | 3.1758E+00 |
| A12 = | −3.9891E−01 | 2.0090E+00 | 1.8783E+00 | −1.9781E−01 | −8.7042E+00 |
| A14 = | 8.9051E−02 | −6.6266E−01 | −6.4958E−01 | 3.8757E−01 | 1.0106E+01 |
| A16 = | | | | | −4.1666E+00 |

| | Surface # | | | | |
|---|---|---|---|---|---|
| | 7 | 8 | 9 | 10 | 11 |
| k = | −1.0431E+01 | −9.9994E−01 | −2.5253E+01 | −2.4136E+00 | −2.8276E+00 |
| A4 = | −1.1719E−01 | 3.7309E−01 | 1.5589E−01 | −3.7668E−01 | −1.9313E−01 |
| A6 = | −5.6586E−02 | −7.9900E−01 | −2.4427E−01 | 2.5482E−01 | 1.1174E−01 |
| A8 = | −8.5469E−01 | 8.3584E−01 | 1.3546E−01 | −1.0146E−01 | −5.4508E−02 |
| A10 = | 3.0549E+00 | −6.2887E−01 | −5.9006E−02 | 2.6058E−02 | 1.7570E−02 |
| A12 = | −4.5312E+00 | 2.6887E−01 | 2.0687E−02 | −4.1768E−03 | −3.3654E−03 |
| A14 = | 3.2958E+00 | −5.4570E−02 | −4.1561E−03 | 3.7680E−04 | 3.4198E−04 |
| A16 = | −9.1176E−01 | 3.6907E−03 | 3.2418E−04 | −1.4560E−05 | −1.4104E−05 |

In the optical image capturing system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| 4th Embodiment | | | |
|---|---|---|---|
| f [mm] | 3.92 | f/R8 | 0.75 |
| Fno | 2.10 | (R9 − R10)/(R9 + R10) | 0.09 |
| HFOV [deg.] | 37.0 | f1/f2 | −0.46 |
| V4/V1 | 0.43 | |f/f3| + |f/f4| + |f/f5| | 0.33 |
| V2 + V3 + V4 | 71.4 | Td/AD | 1.91 |
| T45/T34 | 0.30 | Sd/Td | 0.90 |
| (CT2 + CT3 + CT4)/(CT1 + CT5) | 0.51 | |SAGM41/(SAG41 − SAGM41)| | 0.15 |
| f/|R5| + f/|R6| | 1.43 | | |

5th Embodiment

Figure 5B:
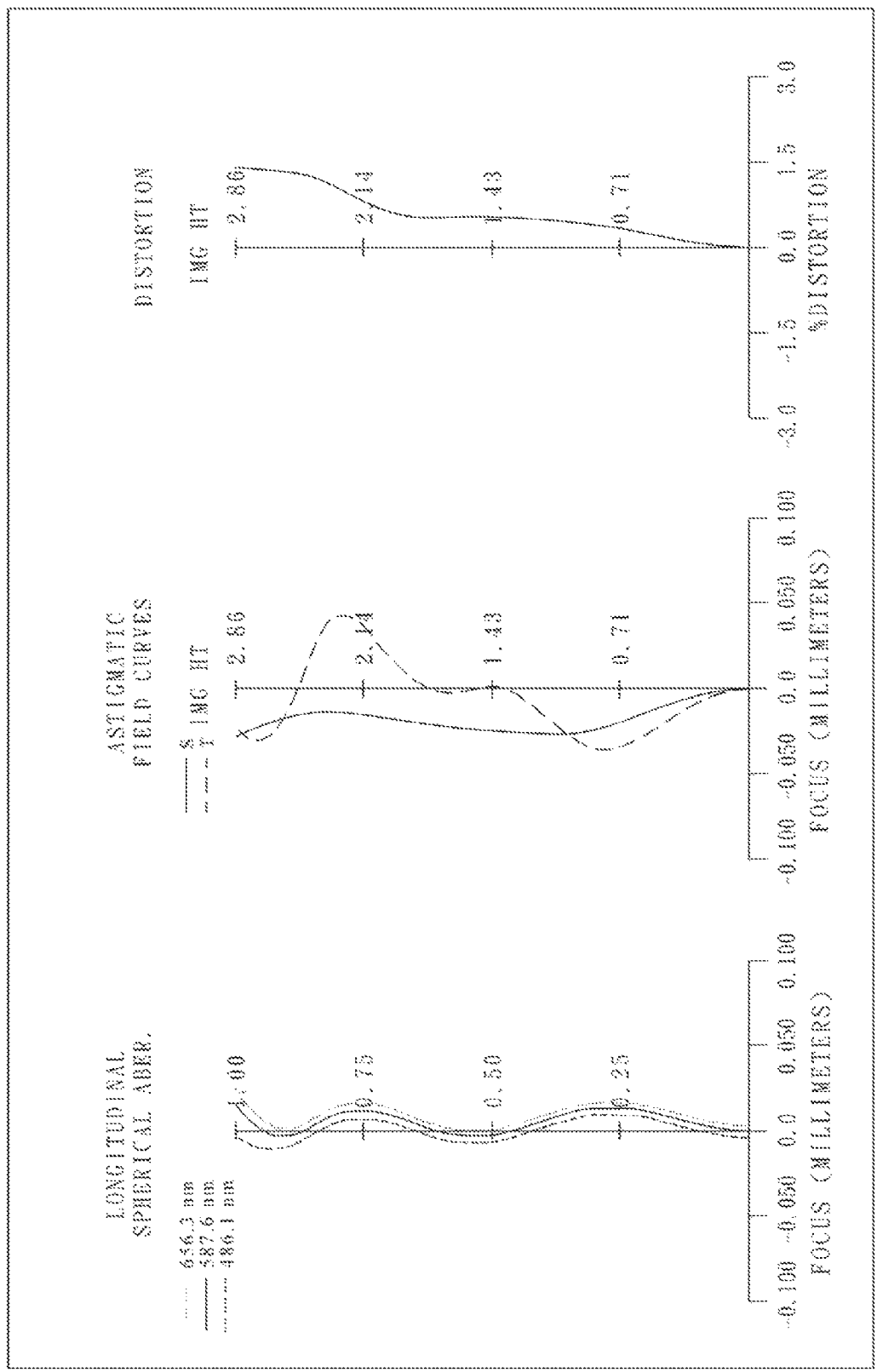
FIG. 5B shows spherical aberration curves, astigmatic field curves and a distortion curve of the optical image capturing system according to the 5th embodiment.

FIG. 5A is a schematic view of an optical image capturing system according to the 5th embodiment of the present disclosure. FIG. 5B shows spherical aberration curves, astigmatic field curves and a distortion curve of the optical image capturing system according to the 5th embodiment. In FIG. 5A, the optical image capturing system includes five lens elements with refractive power, in order from an object side to an image side, an aperture stop 500, a first lens element 510, a second lens element 520, a third lens element 530, a fourth lens element 540, a fifth lens element 550, an IR-cut filter 560 and an image plane 570.

The first lens element 510 with positive refractive power has a convex object-side surface 511 and a convex image-side surface 512. The first lens element 510 is made of plastic material and has the object-side surface 511 and the image-side surface 512 being aspheric.

The second lens element 520 with negative refractive power has a convex object-side surface 521 and a concave image-side surface 522. The second lens element 520 is made of plastic material and has the object-side surface 521 and the image-side surface 522 being aspheric.

The third lens element 530 with negative refractive power has a concave object-side surface 531 and a convex image-side surface 532. The third lens element 530 is made of plastic material and has the object-side surface 531 and the image-side surface 532 being aspheric.

The fourth lens element 540 with positive refractive power has a convex object-side surface 541 and a concave image-side surface 542. The fourth lens element 540 is made of plastic material and has the object-side surface 541 and the image-side surface 542 being aspheric. Furthermore, the image-side surface 542 of the fourth lens element 540 has at least one convex shape at an off-axis region.

The fifth lens element 550 with negative refractive power has a convex object-side surface 551 and a concave image-side surface 552. The fifth lens element 550 is made of plastic material and has the object-side surface 551 and the image-side surface 552 being aspheric. Furthermore, the fifth lens element 550 has at least one inflection point on the image-side surface 552 thereof.

The IR-cut filter 560 is made of glass material, wherein the IR-cut filter 560 is located between the fifth lens element 550 and the image plane 570, and will not affect the focal length of the optical image capturing system.

The detailed optical data of the 5th embodiment are shown in Table 9 and the aspheric surface data are shown in Table 10 below.

TABLE 9

5th Embodiment
f = 3.79 mm, Fno = 2.00, HFOV = 36.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.376 | | | | |
| 2 | Lens 1 | 1.367 | ASP | 0.597 | Plastic | 1.535 | 55.7 | 2.41 |
| 3 | | −18.828 | ASP | 0.030 | | | | |
| 4 | Lens 2 | 116.438 | ASP | 0.220 | Plastic | 1.639 | 23.5 | −4.95 |
| 5 | | 3.079 | ASP | 0.511 | | | | |
| 6 | Lens 3 | −5.811 | ASP | 0.335 | Plastic | 1.639 | 23.5 | −26.18 |
| 7 | | −9.103 | ASP | 0.379 | | | | |
| 8 | Lens 4 | 14.801 | ASP | 0.337 | Plastic | 1.639 | 23.5 | 69.77 |
| 9 | | 21.959 | ASP | 0.198 | | | | |
| 10 | Lens 5 | 1.971 | ASP | 0.817 | Plastic | 1.535 | 55.7 | −17.59 |
| 11 | | 1.394 | ASP | 0.500 | | | | |
| 12 | IR-cut filter | Plano | | 0.210 | Glass | 1.517 | 64.2 | — |
| 13 | | Plano | | 0.251 | | | | |
| 14 | Image | Plano | | — | | | | |

Note:
Reference wavelength is 587.6 nm (d-line).

TABLE 10

Aspheric Coefficients

| Surface # | | | | |
|---|---|---|---|---|
| 2 | 3 | 4 | 5 | 6 |
| k = 1.8917E−01 | −1.0000E+00 | −1.0000E+00 | −8.0702E+00 | −1.1484E+01 |
| A4 = −2.6097E−02 | 4.6410E−02 | −2.2060E−02 | −8.9664E−03 | −1.7457E−01 |
| A6 = 1.2699E−01 | −2.7167E−01 | −5.9418E−02 | 1.2916E−01 | −2.6042E−01 |
| A8 = −3.7024E−01 | 1.1666E+00 | 7.6482E−01 | −7.7226E−02 | −1.4726E−01 |
| A10 = 5.4628E−01 | −2.2716E+00 | −1.8514E+00 | 8.3910E−03 | 3.1432E+00 |
| A12 = −3.8745E−01 | 2.0035E+00 | 1.8948E+00 | −5.4836E−02 | −8.6956E+00 |
| A14 = 8.2517E−02 | −6.5254E−01 | −6.5372E−01 | 3.0151E−01 | 1.0111E+01 |
| A16 = | | | | −4.1663E+00 |

| Surface # | | | | |
|---|---|---|---|---|
| 7 | 8 | 9 | 10 | 11 |
| k = 3.6598E+00 | 2.1651E+00 | −2.9998E+01 | −1.5466E+00 | −4.5032E+00 |
| A4 = −1.4380E−01 | 3.1894E−01 | 1.6198E−01 | −3.8080E−01 | −1.7311E−01 |
| A6 = −4.3923E−02 | −7.5176E−01 | −2.4260E−01 | 2.5417E−01 | 1.0904E−01 |
| A8 = −8.4805E−01 | 8.0517E−01 | 1.3598E−01 | −1.0154E−01 | −5.4546E−02 |
| A10 = 3.0430E+00 | −6.2668E−01 | −5.9103E−02 | 2.6066E−02 | 1.7596E−02 |
| A12 = −4.5432E+00 | 2.7403E−01 | 2.0643E−02 | −4.1711E−03 | −3.3626E−03 |

TABLE 10-continued

| Aspheric Coefficients | | | | | |
|---|---|---|---|---|---|
| A14 = | 3.2944E+00 | −5.3653E−02 | −4.1837E−03 | 3.7801E−04 | 3.4210E−04 |
| A16 = | −9.0181E−01 | 3.1660E−03 | 3.2930E−04 | −1.4856E−05 | −1.4209E−05 |

In the optical image capturing system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| 5th Embodiment | | | |
|---|---|---|---|
| f [mm] | 3.79 | f/R8 | 0.17 |
| Fno | 2.00 | (R9 − R10)/(R9 + R10) | 0.17 |
| HFOV [deg.] | 36.6 | f1/f2 | −0.49 |
| V4/V1 | 0.42 | \|f/f3\| + \|f/f4\| + \|f/f5\| | 0.41 |
| V2 + V3 + V4 | 70.5 | Td/AD | 1.81 |
| T45/T34 | 0.52 | Sd/Td | 0.89 |
| (CT2 + CT3 + CT4)/(CT1 + CT5) | 0.63 | \|SAGM41/(SAG41 − SAGM41)\| | 0.13 |
| f/\|R5\| + f/\|R6\| | 1.07 | | |

6th Embodiment

Figure 6B:
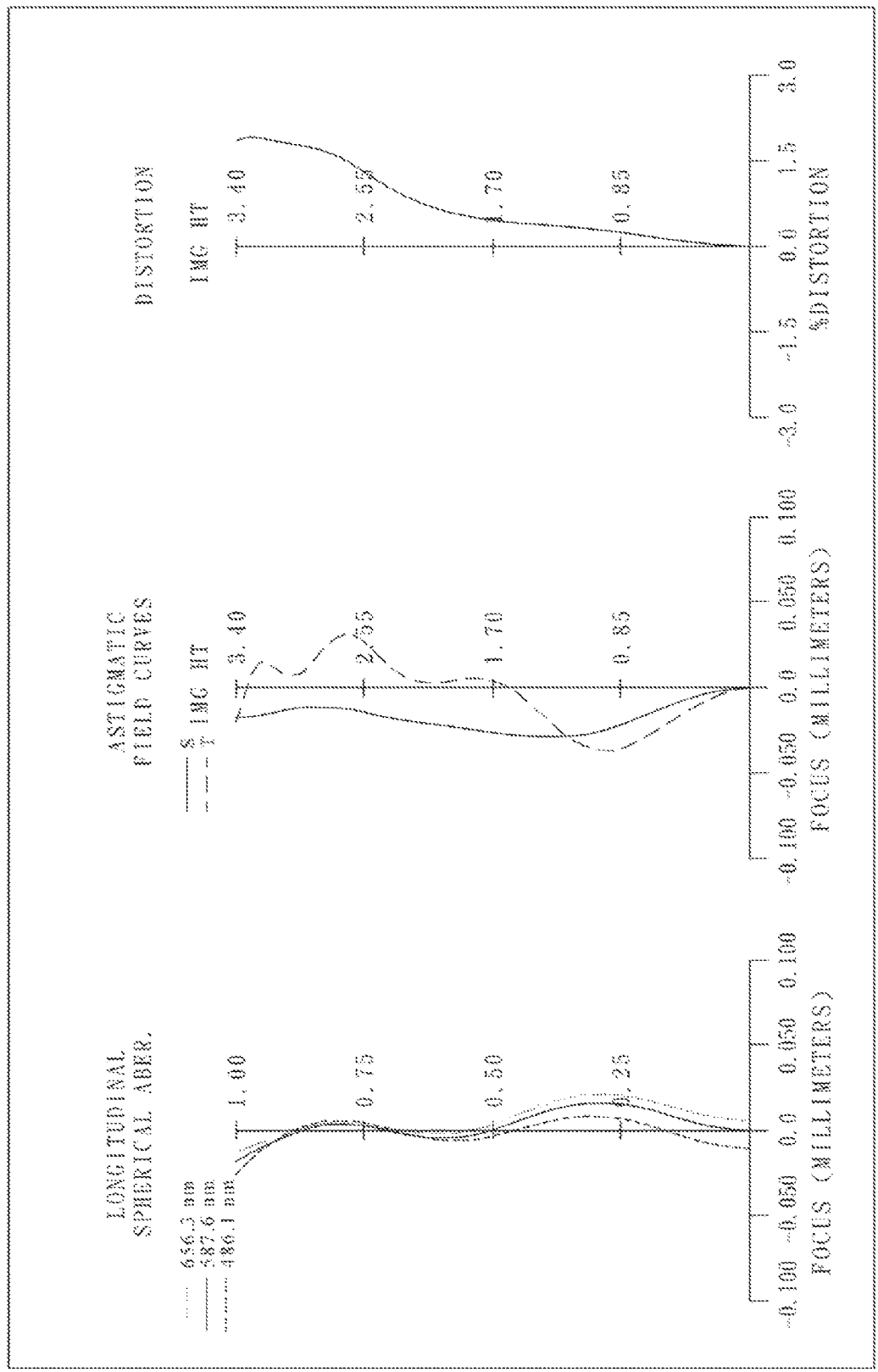
FIG. 6B shows spherical aberration curves, astigmatic field curves and a distortion curve of the optical image capturing system according to the 6th embodiment.

FIG. 6A is a schematic view of an optical image capturing system according to the 6th embodiment of the present disclosure. FIG. 6B shows spherical aberration curves, astigmatic field curves and a distortion curve of the optical image capturing system according to the 6th embodiment. In FIG. 6A, the optical image capturing system includes five lens elements with refractive power, in order from an object side to an image side, an aperture stop 600, a first lens element 610, a second lens element 620, a third lens element 630, a fourth lens element 640, a fifth lens element 650, an IR-cut filter 660 and an image plane 670.

The first lens element 610 with positive refractive power has a convex object-side surface 611 and a concave image-side surface 612. The first lens element 610 is made of plastic material and has the object-side surface 611 and the image-side surface 612 being aspheric.

The second lens element 620 with negative refractive power has a concave object-side surface 621 and a concave image-side surface 622. The second lens element 620 is made of plastic material and has the object-side surface 621 and the image-side surface 622 being aspheric.

The third lens element 630 with negative refractive power has a convex object-side surface 631 and a concave image-side surface 632. The third lens element 630 is made of plastic material and has the object-side surface 631 and the image-side surface 632 being aspheric.

The fourth lens element 640 with negative refractive power has a concave object-side surface 641 and a concave image-side surface 642. The fourth lens element 640 is made of plastic material and has the object-side surface 641 and the image-side surface 642 being aspheric. Furthermore, the image-side surface 642 of the fourth lens element 640 has at least one convex shape at an off-axis region.

The fifth lens element 650 with negative refractive power has a convex object-side surface 651 and a concave image-side surface 652. The fifth lens element 650 is made of plastic material and has the object-side surface 651 and the image-side surface 652 being aspheric. Furthermore, the fifth lens element 650 has at least one inflection point on the image-side surface 652 thereof.

The IR-cut filter 660 is made of glass material, wherein the IR-cut filter 660 is located between the fifth lens element 650 and the image plane 670, and will not affect the focal length of the optical image capturing system.

The detailed optical data of the 6th embodiment are shown in Table 11 and the aspheric surface data are shown in Table 12 below.

TABLE 11

6th Embodiment
f = 4.23 mm, Fno = 2.03, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.350 | | | | |
| 2 | Lens 1 | 1.578 | ASP | 0.714 | Plastic | 1.544 | 55.9 | 3.06 |
| 3 | | 25.859 | ASP | 0.050 | | | | |
| 4 | Lens 2 | −43.851 | ASP | 0.230 | Plastic | 1.640 | 23.3 | −7.73 |
| 5 | | 5.586 | ASP | 0.533 | | | | |
| 6 | Lens 3 | 24.296 | ASP | 0.339 | Plastic | 1.640 | 23.3 | −60.74 |
| 7 | | 14.868 | ASP | 0.454 | | | | |
| 8 | Lens 4 | −30.877 | ASP | 0.449 | Plastic | 1.640 | 23.3 | −21.00 |
| 9 | | 23.924 | ASP | 0.100 | | | | |
| 10 | Lens 5 | 2.165 | ASP | 1.127 | Plastic | 1.544 | 55.9 | −188.10 |
| 11 | | 1.731 | ASP | 0.400 | | | | |
| 12 | IR-cut filter | Plano | | 0.300 | Glass | 1.517 | 64.2 | — |
| 13 | | Plano | | 0.306 | | | | |
| 14 | Image | Plano | | — | | | | |

Note:
Reference wavelength is 587.6 nm (d-line).

TABLE 12

Aspheric Coefficients

| Surface # | | | | | |
|---|---|---|---|---|---|
| | 2 | 3 | 4 | 5 | 6 |
| k = | 1.1700E−01 | −3.0000E+01 | −2.9359E+01 | −1.3540E+01 | 4.9920E+00 |
| A4 = | −1.8408E−02 | −5.7183E−02 | −4.9402E−02 | 2.1372E−02 | −1.0765E−01 |
| A6 = | 5.3217E−02 | −8.5210E−02 | 3.7745E−02 | 9.4486E−02 | −1.0323E−01 |
| A8 = | −1.2442E−01 | 3.4910E−01 | 2.3339E−01 | −1.9447E−02 | −2.4050E−02 |
| A10 = | 1.1219E−01 | −4.7765E−01 | −3.8817E−01 | 9.2701E−03 | 6.3307E−01 |
| A12 = | −4.9541E−02 | 2.8085E−01 | 2.6166E−01 | −1.1484E−02 | −1.2621E+00 |
| A14 = | −1.4144E−03 | −6.5095E−02 | −6.0713E−02 | 2.7280E−02 | 1.0169E+00 |
| A16 = | | | | | −2.9476E−01 |

| Surface # | | | | | |
|---|---|---|---|---|---|
| | 7 | 8 | 9 | 10 | 11 |
| k = | −1.0000E+00 | 4.3295E+00 | −2.2217E+01 | −2.4078E+00 | −3.5742E+00 |
| A4 = | −8.6199E−02 | 2.2922E−01 | 8.9359E−02 | −2.2282E−01 | −1.0410E−01 |
| A6 = | −2.4123E−02 | −3.4272E−01 | −9.6407E−02 | 1.0533E−01 | 4.5890E−02 |
| A8 = | −2.4356E−01 | 2.4649E−01 | 3.9029E−02 | −2.9458E−02 | −1.5907E−02 |
| A10 = | 6.2038E−01 | −1.2988E−01 | −1.2125E−02 | 5.3236E−03 | 3.5870E−03 |
| A12 = | −6.5292E−01 | 3.8279E−02 | 2.9539E−03 | −5.9933E−04 | −4.8178E−04 |
| A14 = | 3.2960E−01 | −5.3444E−03 | −4.1930E−04 | 3.7911E−05 | 3.4471E−05 |
| A16 = | −6.2868E−02 | 3.3966E−04 | 2.3488E−05 | −1.0277E−06 | −1.0043E−06 |

In the optical image capturing system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| 6th Embodiment | | | |
|---|---|---|---|
| f [mm] | 4.23 | f/R8 | 0.18 |
| Fno | 2.03 | (R9 − R10)/(R9 + R10) | 0.11 |
| HFOV [deg.] | 38.3 | f1/f2 | −0.40 |
| V4/V1 | 0.42 | \|f/f3\| + \|f/f4\| + \|f/f5\| | 0.29 |
| V2 + V3 + V4 | 69.9 | Td/AD | 1.92 |
| T45/T34 | 0.22 | Sd/Td | 0.91 |
| (CT2 + CT3 + CT4)/(CT1 + CT5) | 0.55 | \|SAGM41/(SAG41 − SAGM41)\| | 0.06 |
| f/\|R5\| + f/\|R6\| | 0.46 | | |

7th Embodiment

Figure 7A:
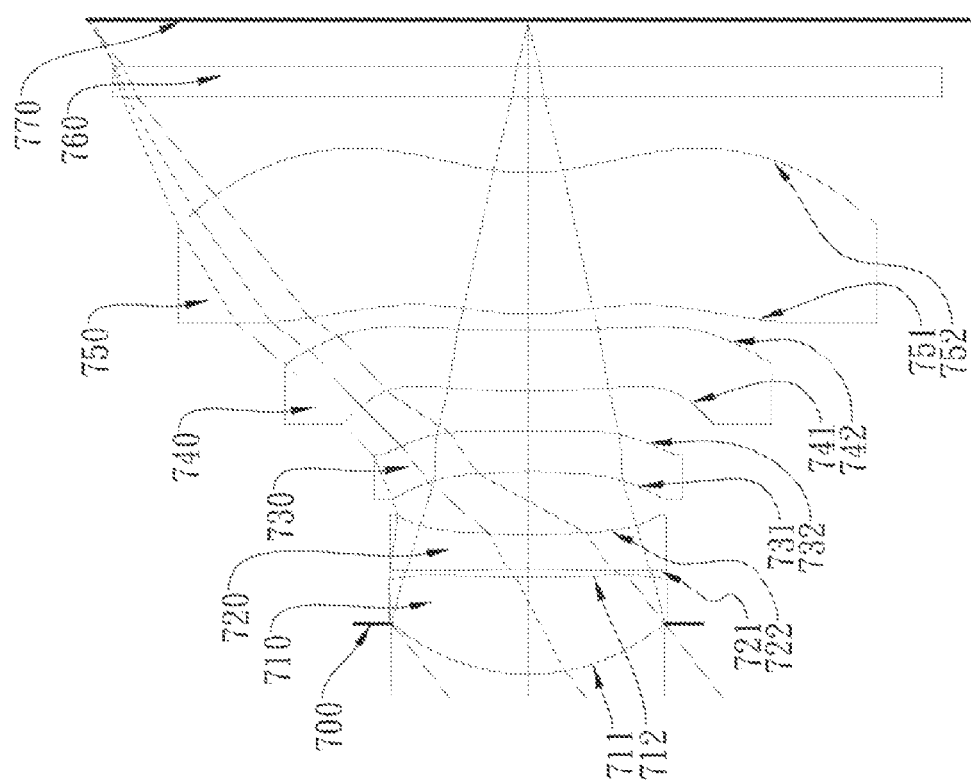
FIG. 7A is a schematic view of an optical image capturing system according to the 7th embodiment of the present disclosure.
Figure 7B:
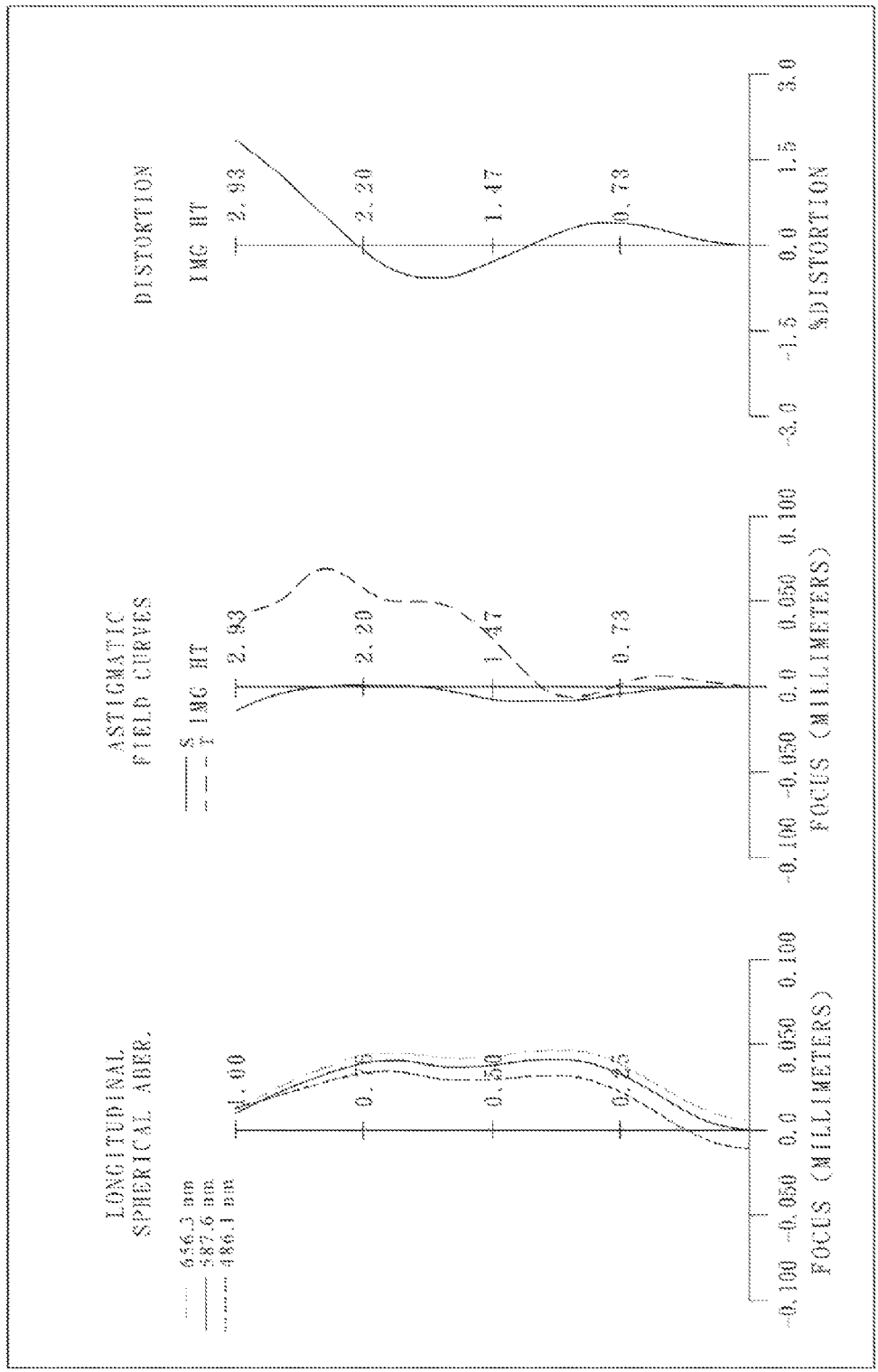
FIG. 7B shows spherical aberration curves, astigmatic field curves and a distortion curve of the optical image capturing system according to the 7th embodiment.

FIG. 7A is a schematic view of an optical image capturing system according to the 7th embodiment of the present disclosure. FIG. 7B shows spherical aberration curves, astigmatic field curves and a distortion curve of the optical image capturing system according to the 7th embodiment. In FIG. 7A, the optical image capturing system includes five lens elements with refractive power, in order from an object side to an image side, an aperture stop 700, a first lens element 710, a second lens element 720, a third lens element 730, a fourth lens element 740, a fifth lens element 750, an IR-cut filter 760 and an image plane 770.

The first lens element 710 with positive refractive power has a convex object-side surface 711 and a concave image-side surface 712. The first lens element 710 is made of plastic material and has the object-side surface 711 and the image-side surface 712 being aspheric.

The second lens element 720 with negative refractive power has a concave object-side surface 721 and a concave image-side surface 722. The second lens element 720 is made of plastic material and has the object-side surface 721 and the image-side surface 722 being aspheric.

The third lens element 730 with negative refractive power has a concave object-side surface 731 and a concave image-side surface 732. The third lens element 730 is made of plastic material and has the object-side surface 731 and the image-side surface 732 being aspheric.

The fourth lens element 740 with positive refractive power has a convex object-side surface 741 and a concave image-side surface 742. The fourth lens element 740 is made of plastic material and has the object-side surface 741 and the image-side surface 742 being aspheric. Furthermore, the image-side surface 742 of the fourth lens element 740 has at least one convex shape at an off-axis region.

The fifth lens element 750 with positive refractive power has a convex object-side surface 751 and a concave image-side surface 752. The fifth lens element 750 is made of plastic material and has the object-side surface 751 and the image-side surface 752 being aspheric. Furthermore, the fifth lens element 750 has at least one inflection point on the image-side surface 752 thereof.

The IR-cut filter 760 is made of glass material, wherein the IR-cut filter 760 is located between the fifth lens element 750 and the image plane 770, and will not affect the focal length of the optical image capturing system.

The detailed optical data of the 7th embodiment are shown in Table 13 and the aspheric surface data are shown in Table 14 below.

TABLE 13

7th Embodiment
f = 3.65 mm, Fno = 2.00, HFOV = 38.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.335 | | | | |
| 2 | Lens 1 | 1.360 | ASP | 0.651 | Plastic | 1.544 | 55.9 | 2.72 |
| 3 | | 14.128 | ASP | 0.052 | | | | |
| 4 | Lens 2 | −13.428 | ASP | 0.232 | Plastic | 1.639 | 23.5 | −8.03 |
| 5 | | 8.355 | ASP | 0.414 | | | | |
| 6 | Lens 3 | −12.759 | ASP | 0.278 | Plastic | 1.640 | 23.3 | −11.59 |
| 7 | | 17.857 | ASP | 0.268 | | | | |
| 8 | Lens 4 | 28.323 | ASP | 0.402 | Plastic | 1.640 | 23.3 | 67.74 |
| 9 | | 81.301 | ASP | 0.107 | | | | |
| 10 | Lens 5 | 1.827 | ASP | 0.945 | Plastic | 1.530 | 55.8 | 323419.38 |
| 11 | | 1.500 | ASP | 0.500 | | | | |
| 12 | IR-cut filter | Plano | | 0.210 | Glass | 1.517 | 64.2 | — |
| 13 | | Plano | | 0.312 | | | | |
| 14 | Image | Plano | | — | | | | |

Note:
Reference wavelength is 587.6 nm (d-line).

TABLE 14

Aspheric Coefficients

| | Surface # | | | | |
|---|---|---|---|---|---|
| | 2 | 3 | 4 | 5 | 6 |
| k = | 9.9122E−02 | 5.0000E+00 | −1.0000E+01 | −3.7699E−02 | 5.0000E+00 |
| A4 = | −4.2249E−02 | −3.7444E−02 | −1.5358E−02 | 2.8688E−02 | −2.7344E−01 |
| A6 = | 1.7452E−01 | −2.2847E−01 | 1.4991E−03 | 2.1101E−01 | −1.4421E−02 |
| A8 = | −4.5621E−01 | 1.1928E+00 | 7.8695E−01 | −1.2676E−01 | −2.2176E−01 |
| A10 = | 5.6813E−01 | −2.3574E+00 | −1.9761E+00 | −3.8151E−02 | 3.0463E+00 |
| A12 = | −3.0068E−01 | 1.9735E+00 | 1.8263E+00 | −6.9743E−02 | −8.7135E+00 |
| A14 = | 6.5859E−03 | −6.3081E−01 | −5.6829E−01 | 2.7078E−01 | 1.0096E+01 |
| A16 = | | | | | −4.1658E+00 |

| | Surface # | | | | |
|---|---|---|---|---|---|
| | 7 | 8 | 9 | 10 | 11 |
| k = | −2.9300E+01 | −1.2737E+00 | −1.0000E+01 | −3.2135E+00 | −3.7366E+00 |
| A4 = | −2.4311E−01 | 3.4860E−01 | 1.5067E−01 | −3.6732E−01 | −1.8318E−01 |
| A6 = | 3.1768E−02 | −8.3901E−01 | −2.3056E−01 | 2.5417E−01 | 1.1152E−01 |
| A8 = | −8.3165E−01 | 8.5896E−01 | 1.3261E−01 | −1.0170E−01 | −5.4709E−02 |
| A10 = | 3.0122E+00 | −6.3017E−01 | −5.7555E−02 | 2.6080E−02 | 1.7610E−02 |
| A12 = | −4.5660E+00 | 2.6739E−01 | 2.0305E−02 | −4.1745E−03 | −3.3634E−03 |
| A14 = | 3.3056E+00 | −5.4179E−02 | −4.2753E−03 | 3.7793E−04 | 3.4201E−04 |
| A16 = | −8.9853E−01 | 4.8403E−03 | 3.5100E−04 | −1.4817E−05 | −1.4198E−05 |

In the optical image capturing system according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| 7th Embodiment | | | |
|---|---|---|---|
| f [mm] | 3.65 | f/R8 | 0.04 |
| Fno | 2.00 | (R9 − R10)/(R9 + R10) | 0.10 |
| HFOV [deg.] | 38.1 | f1/f2 | −0.34 |
| V4/V1 | 0.42 | \|f/f3\| + \|f/f4\| + \|f/f5\| | 0.37 |
| V2 + V3 + V4 | 70.1 | Td/AD | 1.84 |
| T45/T34 | 0.40 | Sd/Td | 0.90 |
| (CT2 + CT3 + CT4)/(CT1 + CT5) | 0.57 | \|SAGM41/(SAG41 − SAGM41)\| | 0.12 |
| f/\|R5\| + f/\|R6\| | 0.49 | | |

8th Embodiment

Figure 8A:
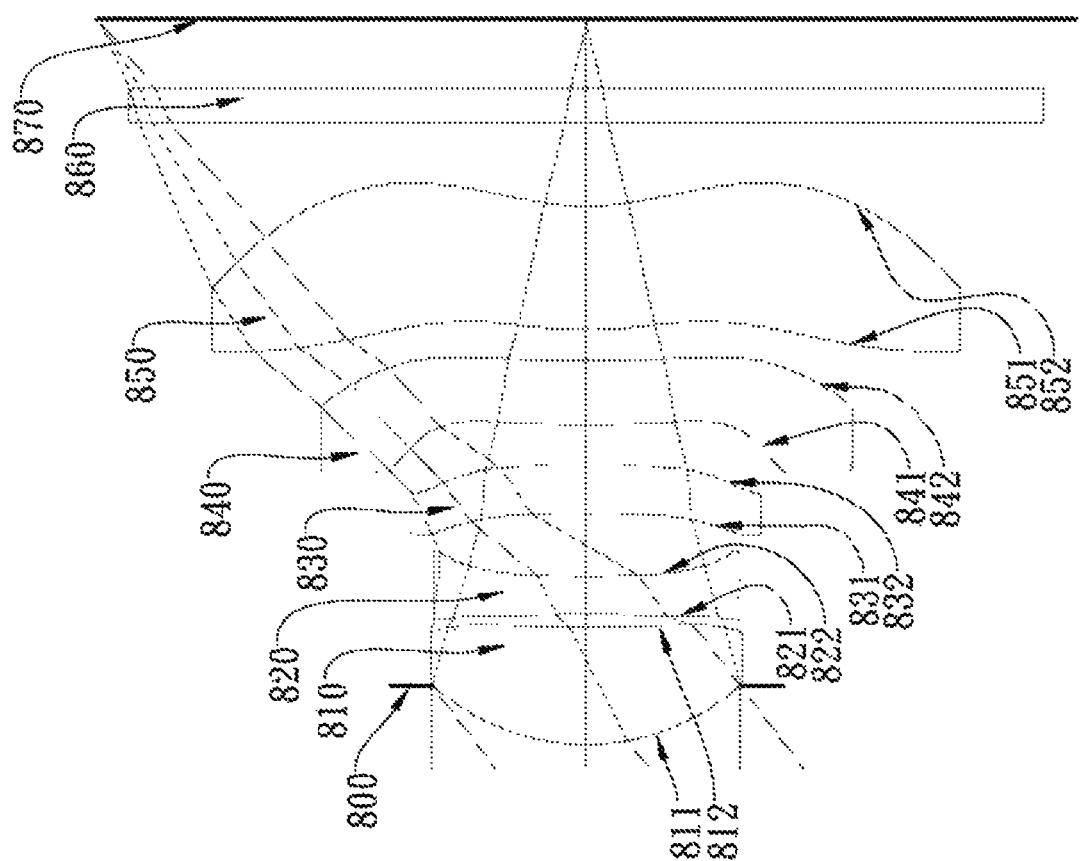
FIG. 8A is a schematic view of an optical image capturing system according to the 8th embodiment of the present disclosure.
Figure 8B:
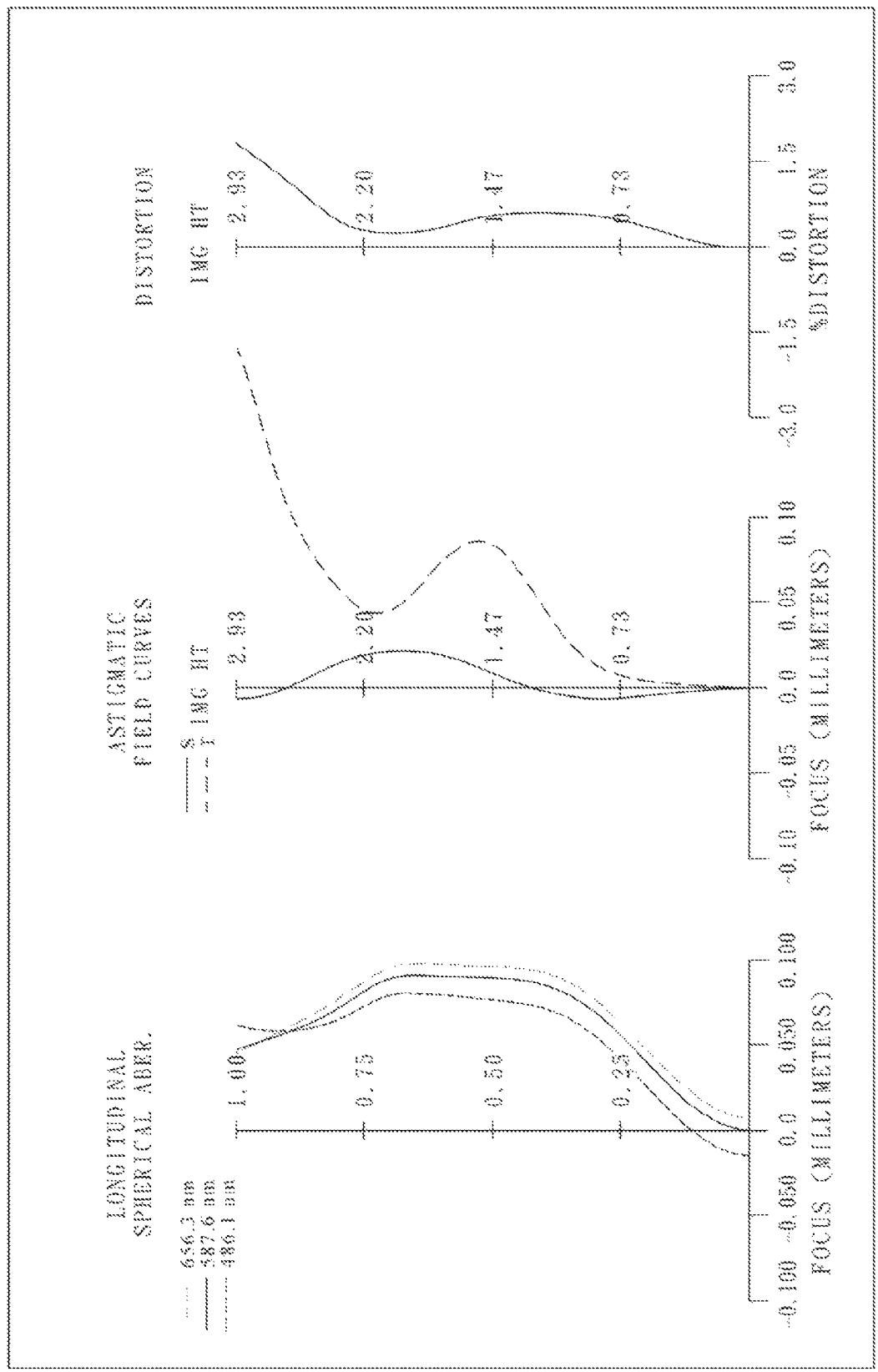
FIG. 8B shows spherical aberration curves, astigmatic field curves and a distortion curve of the optical image capturing system according to the 8th embodiment.

FIG. 8A is a schematic view of an optical image capturing system according to the 8th embodiment of the present disclosure. FIG. 8B shows spherical aberration curves, astigmatic field curves and a distortion curve of the optical image capturing system according to the 8th embodiment. In FIG. 8A, the optical image capturing system includes five lens elements with refractive power, in order from an object side to an image side, an aperture stop 800, a first lens element 810, a second lens element 820, a third lens element 830, a fourth lens element 840, a fifth lens element 850, an IR-cut filter 860 and an image plane 870.

The first lens element 810 with positive refractive power has a convex object-side surface 811 and a concave image-side surface 812. The first lens element 810 is made of plastic material and has the object-side surface 811 and the image-side surface 812 being aspheric.

The second lens element 820 with negative refractive power has a concave object-side surface 821 and a concave image-side surface 822. The second lens element 820 is made of plastic material and has the object-side surface 821 and the image-side surface 822 being aspheric.

The third lens element 830 with negative refractive power has a concave object-side surface 831 and a concave image-side surface 832. The third lens element 830 is made of plastic material and has the object-side surface 831 and the image-side surface 832 being aspheric.

The fourth lens element 840 with positive refractive power has a convex object-side surface 841 and a concave image-side surface 842. The fourth lens element 840 is made of plastic material and has the object-side surface 841 and the image-side surface 842 being aspheric. Furthermore, the image-side surface 842 of the fourth lens element 840 has at least one convex shape at an off-axis region.

The fifth lens element 850 with negative refractive power has a convex object-side surface 851 and a concave image-side surface 852. The fifth lens element 850 is made of plastic material and has the object-side surface 851 and the image-side surface 852 being aspheric. Furthermore, the fifth lens element 850 has at least one inflection point on the image-side surface 852 thereof.

The IR-cut filter 860 is made of glass material, wherein the IR-cut filter 860 is located between the fifth lens element 850 and the image plane 870, and will not affect the focal length of the optical image capturing system.

The detailed optical data of the 8th embodiment are shown in Table 15 and the aspheric surface data are shown in Table 16 below.

TABLE 15

8th Embodiment
f = 3.71 mm, Fno = 2.00, HFOV = 37.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.351 | | | | |
| 2 | Lens 1 | 1.352 | ASP | 0.708 | Plastic | 1.544 | 55.9 | 2.71 |
| 3 | | 13.394 | ASP | 0.072 | | | | |
| 4 | Lens 2 | −13.062 | ASP | 0.232 | Plastic | 1.639 | 23.5 | −6.77 |
| 5 | | 6.508 | ASP | 0.380 | | | | |
| 6 | Lens 3 | −72.315 | ASP | 0.283 | Plastic | 1.614 | 25.6 | −20.19 |
| 7 | | 14.986 | ASP | 0.250 | | | | |
| 8 | Lens 4 | 16.504 | ASP | 0.387 | Plastic | 1.640 | 23.3 | 32.29 |
| 9 | | 81.301 | ASP | 0.179 | | | | |
| 10 | Lens 5 | 1.983 | ASP | 0.750 | Plastic | 1.530 | 55.8 | −25.11 |
| 11 | | 1.500 | ASP | 0.500 | | | | |
| 12 | IR-cut filter | Plano | | 0.210 | Glass | 1.517 | 64.2 | — |
| 13 | | Plano | | 0.417 | | | | |
| 14 | Image | Plano | | — | | | | |

Note:
Reference wavelength is 587.6 nm (d-line).

TABLE 16

Aspheric Coefficients

| | Surface # | | | | |
|---|---|---|---|---|---|
| | 2 | 3 | 4 | 5 | 6 |
| k = | 7.6268E−02 | −6.9132E+00 | 5.0000E+00 | −3.2253E+00 | 5.0000E+00 |
| A4 = | −5.4113E−02 | −1.1709E−02 | −3.7084E−03 | 3.1545E−02 | −2.4381E−01 |
| A6 = | 2.0631E−01 | −2.5573E−01 | −1.8187E−02 | 2.3309E−01 | 5.2013E−02 |
| A8 = | −4.8142E−01 | 1.1979E+00 | 7.8695E−01 | −1.2676E−01 | −2.4545E−01 |
| A10 = | 5.6813E+00 | −2.4216E+00 | −2.0836E+00 | −7.9202E−02 | 3.0170E+00 |
| A12 = | −2.8405E−01 | 1.9735E+00 | 1.8263E+00 | −6.9743E−02 | −8.7135E+00 |
| A14 = | 6.5859E−03 | −5.8983E−01 | −5.1371E−01 | 2.7078E−01 | 1.0096E+01 |
| A16 = | | | | | −4.1658E+00 |

| | Surface # | | | | |
|---|---|---|---|---|---|
| | 7 | 8 | 9 | 10 | 11 |
| k = | −2.9300E+01 | −1.2737E+00 | 5.0000E+00 | −3.2135E+00 | −4.9569E+00 |
| A4 = | −2.0379E−01 | 2.8934E−01 | 1.3449E−01 | −3.7007E−01 | −1.8318E−01 |
| A6 = | −1.5400E−02 | −8.3901E−01 | −2.3056E−01 | 2.5417E−01 | 1.1009E−01 |
| A8 = | −8.0343E−01 | 8.8320E−01 | 1.3261E−01 | −1.0161E−01 | −5.4713E−02 |
| A10 = | 3.0094E+00 | −6.7009E−01 | −5.5965E−02 | 2.6057E−02 | 1.7633E−02 |

TABLE 16-continued

| Aspheric Coefficients | | | | | |
|---|---|---|---|---|---|
| A12 = | −4.5802E+00 | 2.6739E−01 | 1.9921E−02 | −4.1751E−03 | −3.3634E−03 |
| A14 = | 3.3046E+00 | −5.4179E−02 | −4.3750E−03 | 3.7847E−04 | 3.4182E−04 |
| A16 = | −8.9853E−01 | 1.1803E−02 | 3.7616E−04 | −1.4742E−05 | −1.4140E−05 |

In the optical image capturing system according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| 8th Embodiment | | | |
|---|---|---|---|
| f [mm] | 3.71 | f/R8 | 0.05 |
| Fno | 2.00 | (R9 − R10)/(R9 + R10) | 0.14 |
| HFOV [deg.] | 37.4 | f1/f2 | −0.40 |
| V4/V1 | 0.42 | \|f/f3\| + \|f/f4\| + \|f/f5\| | 0.45 |
| V2 + V3 + V4 | 72.4 | Td/AD | 1.75 |
| T45/T34 | 0.72 | Sd/Td | 0.89 |
| (CT2 + CT3 + CT4)/(CT1 + CT5) | 0.62 | \|SAGM41/(SAG41 − SAGM41)\| | 0.08 |
| f/\|R5\| + f/\|R6\| | 0.30 | | |

9th Embodiment

Figure 9B:
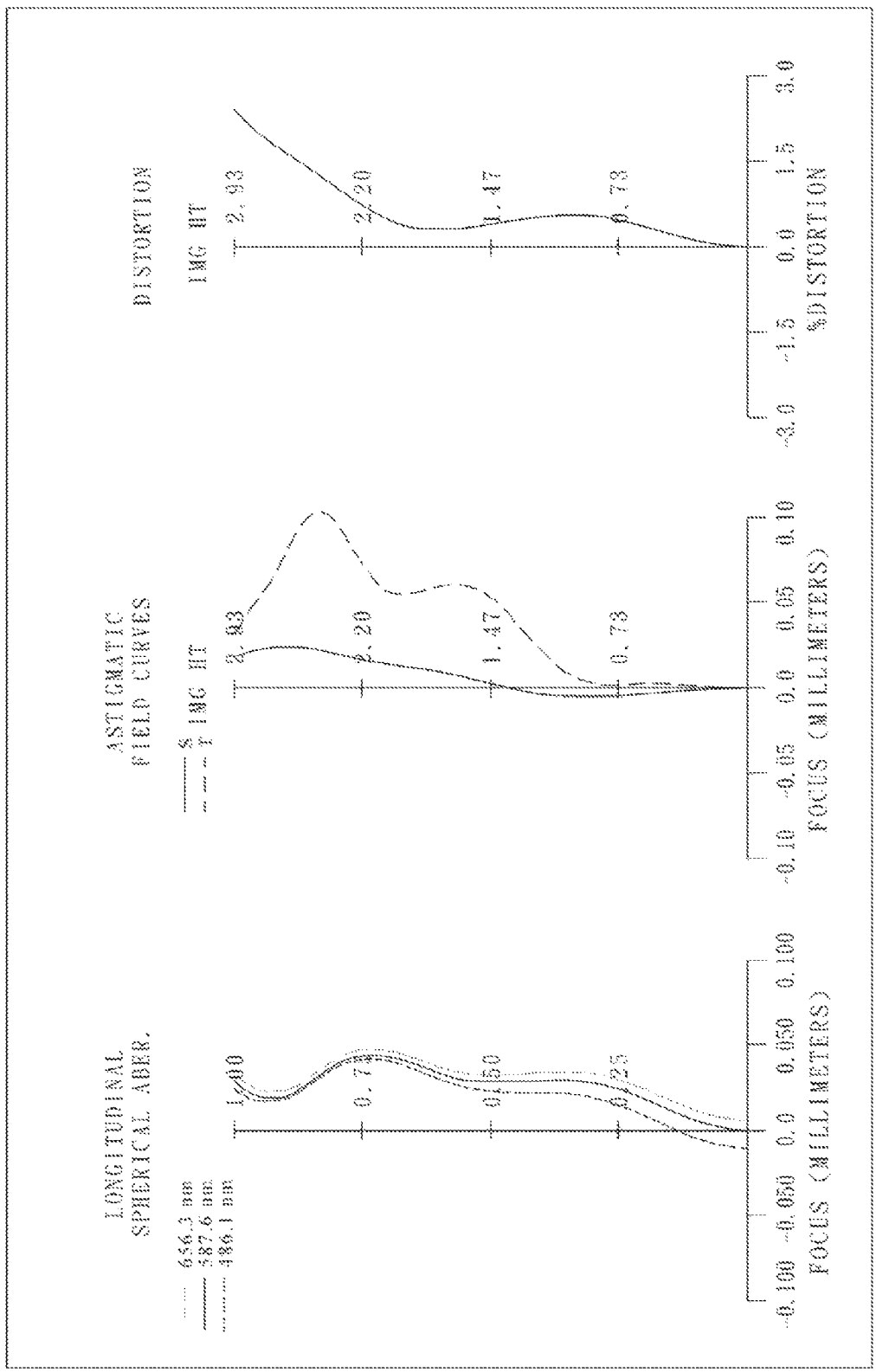
FIG. 9B shows spherical aberration curves, astigmatic field curves and a distortion curve of the optical image capturing system according to the 9th embodiment.

FIG. 9A is a schematic view of an optical image capturing system according to the 9th embodiment of the present disclosure. FIG. 9B shows spherical aberration curves, astigmatic field curves and a distortion curve of the optical image capturing system according to the 9th embodiment. In FIG. 9A, the optical image capturing system includes five lens elements with refractive power, in order from an object side to an image side, a first lens element 910, an aperture stop 900, a second lens element 920, a third lens element 930, a fourth lens element 940, a fifth lens element 950, an IR-cut filter 960 and an image plane 970.

The first lens element 910 with positive refractive power has a convex object-side surface 911 and a concave image-side surface 912. The first lens element 910 is made of plastic material and has the object-side surface 911 and the image-side surface 912 being aspheric.

The second lens element 920 with negative refractive power has a convex object-side surface 921 and a concave image-side surface 922. The second lens element 920 is made of plastic material and has the object-side surface 921 and the image-side surface 922 being aspheric.

The third lens element 930 with negative refractive power has a concave object-side surface 931 and a convex image-side surface 932. The third lens element 930 is made of plastic material and has the object-side surface 931 and the image-side surface 932 being aspheric.

The fourth lens element 940 with negative refractive power has a concave object-side surface 941 and a concave image-side surface 942. The fourth lens element 940 is made of plastic material and has the object-side surface 941 and the image-side surface 942 being aspheric. Furthermore, the image-side surface 942 of the fourth lens element 940 has at least one convex shape at an off-axis region.

The fifth lens element 950 with positive refractive power has a convex object-side surface 951 and a concave image-side surface 952. The fifth lens element 950 is made of plastic material and has the object-side surface 951 and the image-side surface 952 being aspheric. Furthermore, the fifth lens element 950 has at least one inflection point on the image-side surface 952 thereof.

The IR-cut filter 960 is made of glass material, wherein the IR-cut filter 960 is located between the fifth lens element 950 and the image plane 970, and will not affect the focal length of the optical image capturing system.

The detailed optical data of the 9th embodiment are shown in Table 17 and the aspheric surface data are shown in Table 18 below.

TABLE 17

9th Embodiment
f = 3.79 mm, Fno = 2.10, HFOV = 36.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.361 | ASP | 0.592 | Plastic | 1.544 | 55.9 | 2.72 |
| 2 | | 14.289 | ASP | 0.018 | | | | |
| 3 | Ape. Stop | Plano | | 0.024 | | | | |
| 4 | Lens 2 | 273.101 | ASP | 0.232 | Plastic | 1.639 | 23.5 | −7.38 |
| 5 | | 4.635 | ASP | 0.461 | | | | |
| 6 | Lens 3 | −6.052 | ASP | 0.324 | Plastic | 1.614 | 25.6 | −34.42 |
| 7 | | −8.653 | ASP | 0.405 | | | | |
| 8 | Lens 4 | −17.458 | ASP | 0.370 | Plastic | 1.640 | 23.3 | −21.86 |
| 9 | | 70.901 | ASP | 0.100 | | | | |
| 10 | Lens 5 | 1.815 | ASP | 0.924 | Plastic | 1.544 | 55.9 | 487.54 |
| 11 | | 1.500 | ASP | 0.500 | | | | |
| 12 | IR-cut filter | Plano | | 0.210 | Glass | 1.517 | 64.2 | — |
| 13 | | Plano | | 0.311 | | | | |
| 14 | Image | Plano | | — | | | | |

Note:
Reference wavelength is 587.6 nm (d-line).

TABLE 18

Aspheric Coefficients

| Surface # | 1 | 2 | 4 | 5 | 6 |
|---|---|---|---|---|---|
| k = | 1.5841E−01 | 5.0000E+00 | 5.0000E+00 | −2.2806E+01 | 4.9999E+00 |
| A4 = | −3.2509E−02 | −8.4641E−02 | −9.8975E−02 | 2.2380E−01 | −1.7019E−01 |
| A6 = | 1.4266E−01 | −1.7047E−01 | 6.0190E−02 | 1.7348E−01 | −2.5252E−01 |
| A8 = | −4.1548E−01 | 1.2053E+00 | 7.8695E−01 | −1.2676E−01 | −1.2182E−01 |
| A10 = | 5.6813E−01 | −2.3645E+00 | −1.9279E+00 | 5.9856E−02 | 3.1315E+00 |
| A12 = | −3.2689E−01 | 1.9735E+00 | 1.8263E+00 | −6.9743E−02 | −8.7135E+00 |
| A14 = | 6.5859E−03 | −6.2978E−01 | −5.8590E−01 | 2.7089E−01 | 1.0096E+01 |
| A16 = | | | | | −4.1657E+00 |

| Surface # | 7 | 8 | 9 | 10 | 11 |
|---|---|---|---|---|---|
| k = | 3.8218E+01 | 4.3738E+00 | −3.0000E+01 | −3.2135E+00 | −3.8245E+00 |
| A4 = | −1.1086E−01 | 4.0890E−01 | 1.6378E−01 | −3.7203E−01 | −1.8318E−01 |
| A6 = | −8.1046E−02 | −8.3908E−01 | −2.3056E−01 | 2.5417E−01 | 1.1141E−01 |
| A8 = | −8.2827E−01 | 8.6004E−01 | 1.3261E−01 | −1.0153E−01 | −5.4563E−02 |
| A10 = | 3.0599E+00 | −6.3077E−01 | −5.9556E−02 | 2.6075E−02 | 1.7571E−02 |
| A12 = | −4.5466E+00 | 2.6739E−01 | 2.0680E−02 | −4.1755E−03 | −3.3634E−03 |
| A14 = | 3.2785E+00 | −5.4179E−02 | −4.1446E−03 | 3.7732E−04 | 3.4210E−04 |
| A16 = | −8.9853E−01 | 3.9467E−03 | 3.3115E−04 | −1.4701E−05 | −1.4143E−05 |

In the optical image capturing system according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following relationships:

| 9th Embodiment | | | |
|---|---|---|---|
| f [mm] | 3.79 | f/R8 | 0.05 |
| Fno | 2.10 | (R9 − R10)/(R9 + R10) | 0.10 |
| HFOV [deg.] | 36.8 | f1/f2 | −0.37 |
| V4/V1 | 0.42 | $\|f/f3\| + \|f/f4\| + \|f/f5\|$ | 0.29 |
| V2 + V3 + V4 | 72.4 | Td/AD | 2.08 |
| T45/T34 | 0.25 | Sd/Td | 0.82 |
| (CT2 + CT3 + CT4)/(CT1 + CT5) | 0.61 | $\|SAGM41/(SAG41 - SAGM41)\|$ | 0.07 |
| $f/\|R5\| + f/\|R6\|$ | 1.07 | | |

It is to be noted that TABLES 1-18 show different data of the different embodiments; however, the data of the different embodiments are obtained from experiments. Therefore, any imaging lens system of the same structure is considered to be less than or equal to the scope of the present disclosure even if it uses different data. The embodiments depicted above and the appended drawings are exemplary and are not intended to limit the scope of the present disclosure.

What is claimed is:

1. An optical image capturing system comprising five lens elements with refractive power, in order from an object side to an image side:
   a first lens element with positive refractive power having a convex object-side surface;
   a second lens element with negative refractive power having a concave image-side surface;
   a third lens element having negative refractive power;
   a fourth lens element with refractive power having a concave image-side surface, wherein an object-side surface and the image-side surface of the fourth lens element are aspheric; and
   a fifth lens element with refractive power having a concave image-side surface, wherein an object-side surface and the image-side surface of the fifth lens element are aspheric, and the fifth lens element has at least one inflection point on the image-side surface thereof;
   wherein the optical image capturing system has a total of five lens elements with refractive power; and
   the optical image capturing system further comprising a stop, wherein the axial distance between the object-side surface of the first lens element and the image-side surface of the fifth lens element is Td, an effective diameter of the stop is AD, and the following relationship is satisfied:

$1.2 < Td/AD < 2.0$;

wherein a focal length of the optical image capturing system is f, a curvature radius of an object-side surface of the third lens element is R5, a curvature radius of an image-side surface of the third lens element is R6, and the following relationship is satisfied:

$f/|R5| + f/|R6| < 2.5$.

2. The optical image capturing system of claim 1, wherein the object-side surface of the fifth lens element is convex.

3. The optical image capturing system of claim 2, wherein an axial distance between the fourth lens element and the fifth lens element is T45, an axial distance between the third lens element and the fourth lens element is T34, and the following relationship is satisfied:

$0.05 < T45/T34 < 0.9$.

4. The optical image capturing system of claim 2, wherein a curvature radius of the object-side surface of the fifth lens element is R9, a curvature radius of the image-side surface of the fifth lens element is R10, and the following relationship is satisfied:

$0 < (R9−R10)/(R9+R10) < 0.2$.

5. The optical image capturing system of claim 2, wherein a central thickness of the second lens element is CT2, a central thickness of the third lens element is CT3, a central thickness of the fourth lens element is CT4, a central thickness of the first lens element is CT1, a central thickness of the fifth lens element is CT5, and the following relationship is satisfied:

$$0.3<(CT2+CT3+CT4)/(CT1+CT5)<0.7.$$

6. The optical image capturing system of claim 1, wherein the focal length of the optical image capturing system is f, the curvature radius of the object-side surface of the third lens element is R5, the curvature radius of the image-side surface of the third lens element is R6, and the following relationship is satisfied:

$$f/|R5|+f/|R6|<1.8.$$

7. The optical image capturing system of claim 6, wherein the third lens element has a concave object-side surface.

8. The optical image capturing system of claim 6, wherein a focal length of the first lens element is f1, a focal length of the second lens element is f2, and the following relationship is satisfied:

$$-0.50<f1/f2<0.$$

9. The optical image capturing system of claim 6, wherein an Abbe number of the second lens element is V2, an Abbe number of the third lens element is V3, an Abbe number of the fourth lens element is V4, and the following relationship is satisfied:

$$V2+V3+V4<85.$$

10. The optical image capturing system of claim 1, wherein an axial distance between the stop and the image-side surface of the fifth lens element is Sd, an axial distance between the object-side surface of the first lens element and the image-side surface of the fifth lens element is Td, and the following relationship is satisfied:

$$0.85<Sd/Td<0.95.$$

11. The optical image capturing system of claim 10, wherein the focal length of the optical image capturing system is f, a focal length of the third lens element is f3, a focal length of the fourth lens element is f4, a focal length of the fifth lens element is f5, and the following relationship is satisfied:

$$|f/f3|+|f/f4|+|f/f5|<0.6.$$

12. The optical image capturing system of claim 1, wherein a distance in parallel with an optical axis from an axial vertex on the object-side surface of the fourth lens element to 50% of a maximum effective diameter position on the object-side surface of the fourth lens element is SAGM41, a distance in parallel with the optical axis from an axial vertex on the object-side surface of the fourth lens element to the maximum effective diameter position on the object-side surface of the fourth lens element is SAG41, and the following relationship is satisfied:

$$|SAGM41/(SAG41-SAGM41)|<0.25.$$

13. The optical image capturing system of claim 1, wherein the focal length of the optical image capturing system is f, a curvature radius of the image-side surface of the fourth lens element is R8, and the following relationship is satisfied:

$$0<f/R8<1.5.$$

14. An optical image capturing system comprising five lens elements with refractive power, in order from an object side to an image side:
   a first lens element with positive refractive power having a convex object-side surface;
   a second lens element having refractive power;
   a third lens element having negative refractive power;
   a fourth lens element with refractive power having a concave image-side surface, wherein an object-side surface and the image-side surface of the fourth lens element are aspheric; and
   a fifth lens element with refractive power having a concave image-side surface, wherein an object-side surface and the image-side surface of the fifth lens element are aspheric, and the fifth lens element has at least one inflection point on the image-side surface thereof;
   wherein the optical image capturing system has a total of five lens elements with refractive power; and
   wherein an Abbe number of the first lens element is V1, an Abbe number of the fourth lens element is V4, and the following relationship is satisfied:

$$0.20<V4/V1<0.57; \text{ and}$$

wherein a central thickness of the second lens element is CT2, a central thickness of the third lens element is CT3, a central thickness of the fourth lens element is CT4, a central thickness of the first lens element is CT1, a central thickness of the fifth lens element is CT5, and the following relationship is satisfied:

$$0.3<(CT2+CT3+CT4)/(CT1+CT5)<0.7.$$

15. The optical image capturing system of claim 14, wherein the fourth lens element has negative refractive power.

16. The optical image capturing system of claim 14, wherein the second lens element has a concave image-side surface, and the third lens element has a concave object-side surface.

17. The optical image capturing system of claim 14, wherein the object-side surface of the fifth lens element is convex.

18. The optical image capturing system of claim 14, wherein an f-number of the optical image capturing system is Fno, and the following relationship is satisfied:

$$Fno<2.2.$$

19. The optical image capturing system of claim 14, wherein a focal length of the optical image capturing system is f, a focal length of the third lens element is f3, a focal length of the fourth lens element is f4, a focal length of the fifth lens element is f5, and the following relationship is satisfied:

$$|f/f3|+|f/f4|+|f/f5|<0.6.$$

20. The optical image capturing system of claim 14, wherein a distance in parallel with an optical axis from an axial vertex on the object-side surface of the fourth lens element to 50% of a maximum effective diameter position on the object-side surface of the fourth lens element is SAGM41, a distance in parallel with the optical axis from an axial vertex on the object-side surface of the fourth lens element to the maximum effective diameter position on the object-side surface of the fourth lens element is SAG41, and the following relationship is satisfied:

$$|SAGM41/(SAG41-SAGM41)|<0.25.$$

21. The optical image capturing system of claim 14, wherein the image-side surface of the fourth lens element has at least one convex shape at an off-axis region.

22. The optical image capturing system of claim 14, wherein a focal length of the optical image capturing system is f, a curvature radius of the object-side surface of the third lens element is R5, a curvature radius of the image-side surface of the third lens element is R6, and the following relationship is satisfied:

$$f/|R5|+f/|R6|<2.5.$$

* * * * *